United States Patent
Tanaka et al.

(10) Patent No.: US 8,000,209 B2
(45) Date of Patent: Aug. 16, 2011

(54) OPTICAL PICKUP, OPTICAL ELEMENT, OPTICAL INFORMATION DEVICE, COMPUTER, OPTICAL INFORMATION MEDIUM PLAYER, CAR NAVIGATION SYSTEM, OPTICAL INFORMATION MEDIUM RECORDER AND OPTICAL DISK SERVER FOR USE WITH A LIGHT SOURCE WHICH EMITS A DIVERGENT BEAM

(75) Inventors: Toshiyasu Tanaka, Osaka (JP); Yoshiaki Komma, Osaka (JP); Kousei Sano, Osaka (JP); Hidenori Wada, Kyoto (JP); Keiichi Matsuzaki, Osaka (JP); Kanji Wakabayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 452 days.

(21) Appl. No.: 12/280,812

(22) PCT Filed: Feb. 27, 2007

(86) PCT No.: PCT/JP2007/053660
§ 371 (c)(1),
(2), (4) Date: Aug. 27, 2008

(87) PCT Pub. No.: WO2007/009963
PCT Pub. Date: Sep. 7, 2007

(65) Prior Publication Data
US 2009/0138901 A1     May 28, 2009

(30) Foreign Application Priority Data
Feb. 28, 2006    (JP) .................................. 2006-054071

(51) Int. Cl.
*G11B 7/00* (2006.01)
(52) U.S. Cl. .................................. 369/112.23; 369/121

(58) Field of Classification Search ........................ None
See application file for complete search history.

(56) References Cited

U.S. PATENT DOCUMENTS
2001/0002896 A1*   6/2001   Yanagisawa et al. ..... 369/112.17
(Continued)

FOREIGN PATENT DOCUMENTS
JP         2003-178480 A     6/2003
(Continued)

OTHER PUBLICATIONS

Microfilm of the specification and drawings annexed to the request of Japanese Utility Model Application No. 104707/1990 (Laid-Open No. 62508/1992) (Asahi Optical Co., Ltd.), May 28, 1992, Figs. 1 to 2.

(Continued)

*Primary Examiner* — Paul Huber
(74) *Attorney, Agent, or Firm* — RatnerPrestia

(57) ABSTRACT

An optical pickup includes: a laser light source which outputs an divergent beam having an elliptical far-field pattern; a beam shaping element having at least one cylindrical plane and which shapes the divergent beam outputted from the laser light source into an divergent beam having a prescribed shape in which at least the length in the major axis direction of the elliptical shape is shortened; a light collecting portion having a beam splitter which perpendicularly collects the divergent beam that is outputted from the beam shaping element and which has a prescribed shape on the recording surface of an optical disk , and a mirror or the like; and a light detecting portion The optical axis of the divergent beam is rotated so that the direction in which the major axis of the divergent beam having a prescribed shape is shortened conforms to the radial direction of an optical information recording medium.

17 Claims, 27 Drawing Sheets

U.S. PATENT DOCUMENTS

| | | | |
|---|---|---|---|
| 2004/0145997 A1* | 7/2004 | Yasuda et al. | 369/112.24 |
| 2005/0281170 A1* | 12/2005 | Nagashima | 369/112.01 |
| 2008/0163278 A1* | 7/2008 | Wakabayashi et al. | 720/681 |

FOREIGN PATENT DOCUMENTS

| | | |
|---|---|---|
| JP | 2004-247032 A | 9/2004 |
| JP | 2005-141884 A | 6/2005 |
| JP | 2005-209325 A | 8/2005 |
| JP | 2005-317168 A | 11/2005 |
| WO | WO 2005/104110 A1 * | 11/2005 |

OTHER PUBLICATIONS

International Search Report for International Application No. PCT/JP2007/053660 dated Apr. 10, 2007.

* cited by examiner

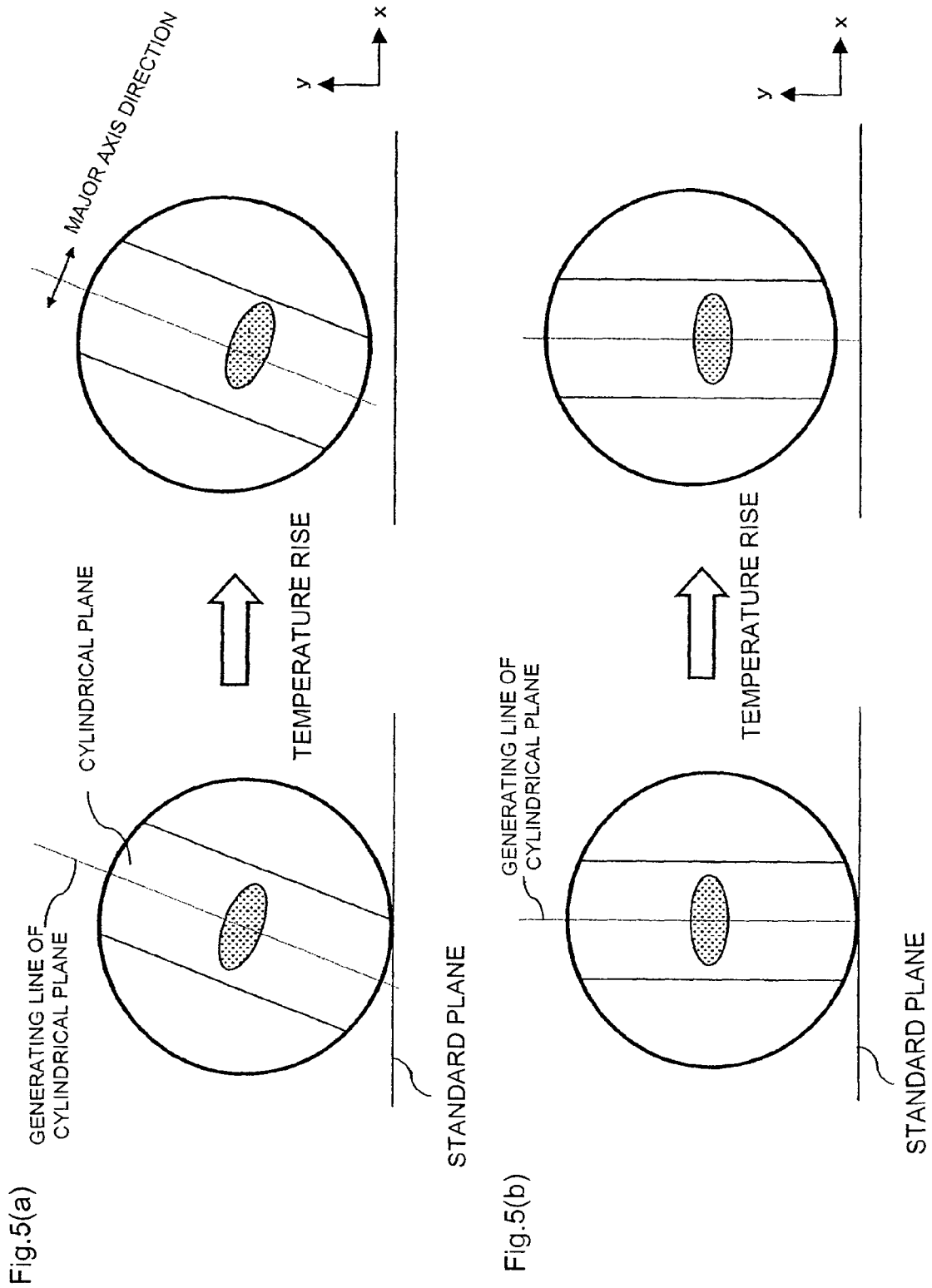

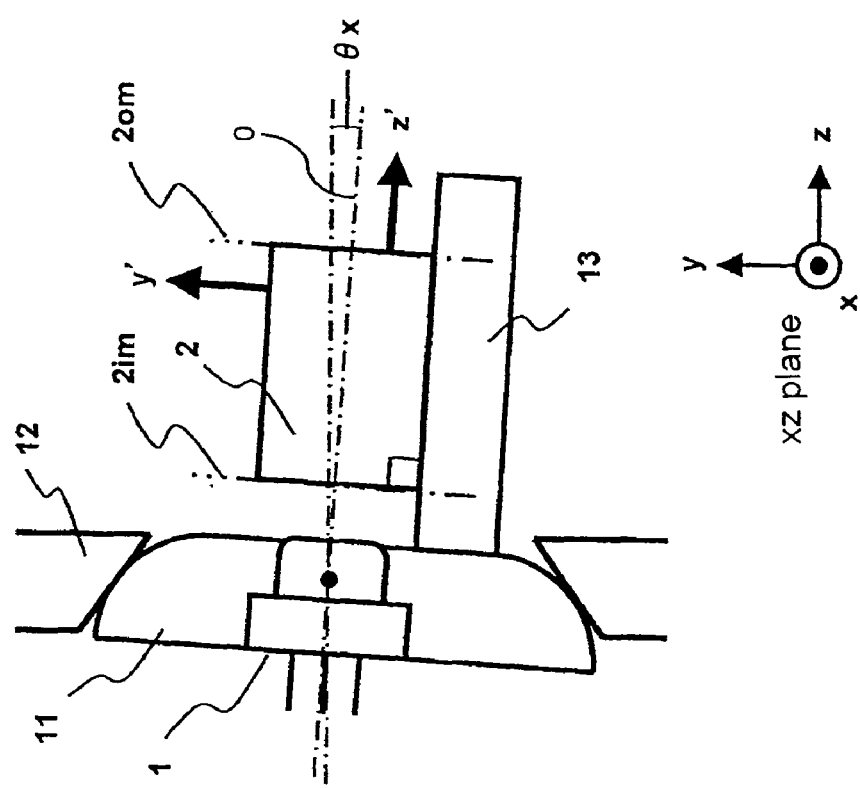
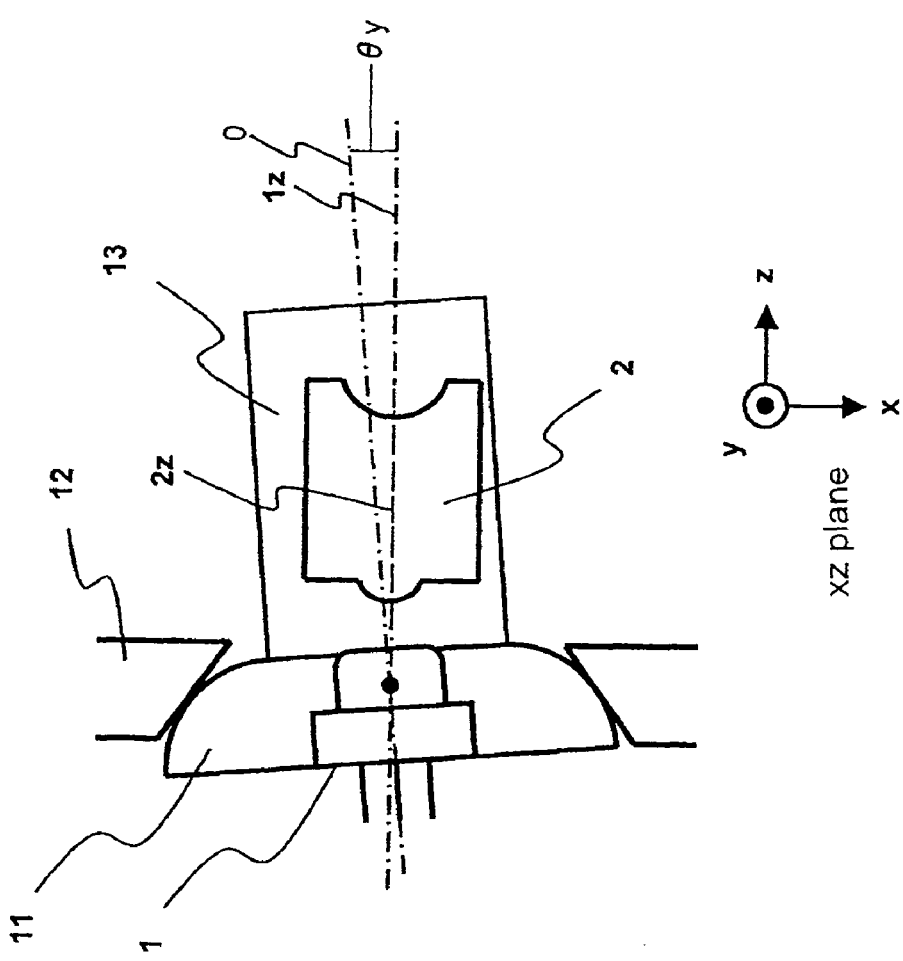
Fig.7(a)
Fig.7(b)

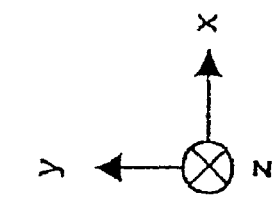
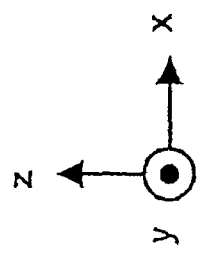
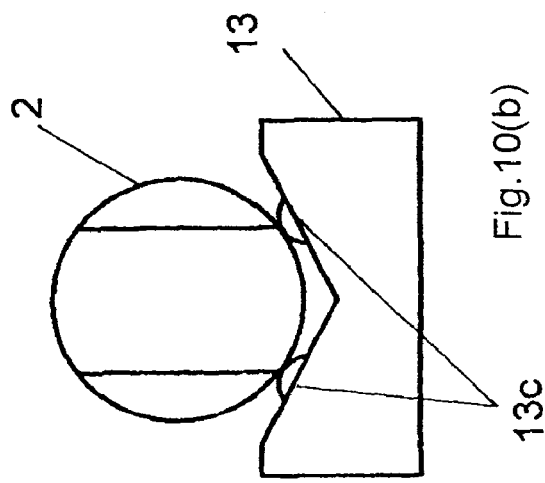
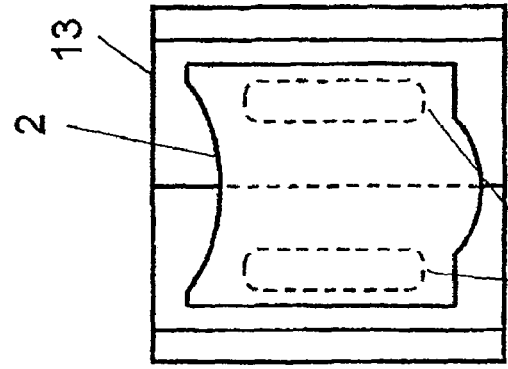
Fig.10(a)
Fig.10(b)
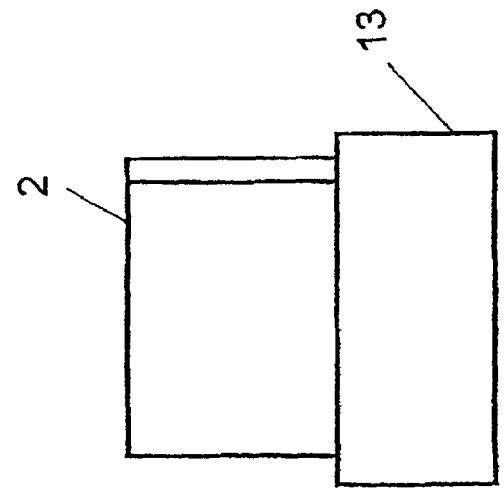
Fig.10(c)
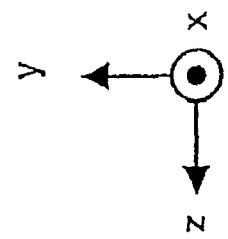

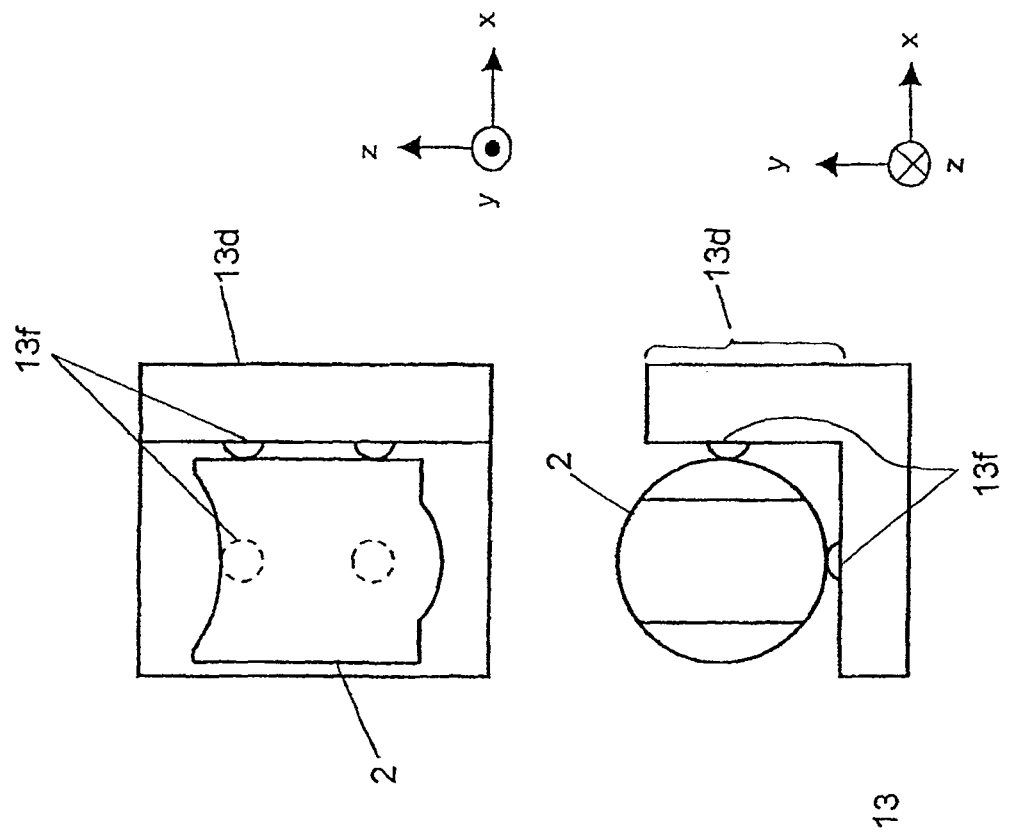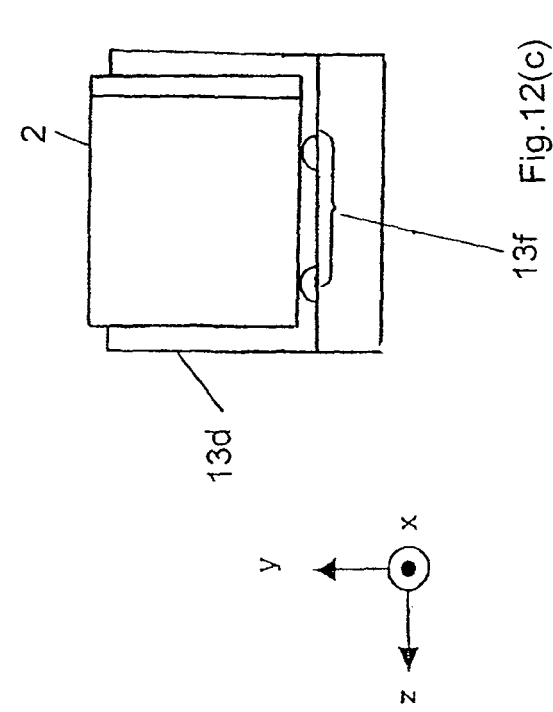

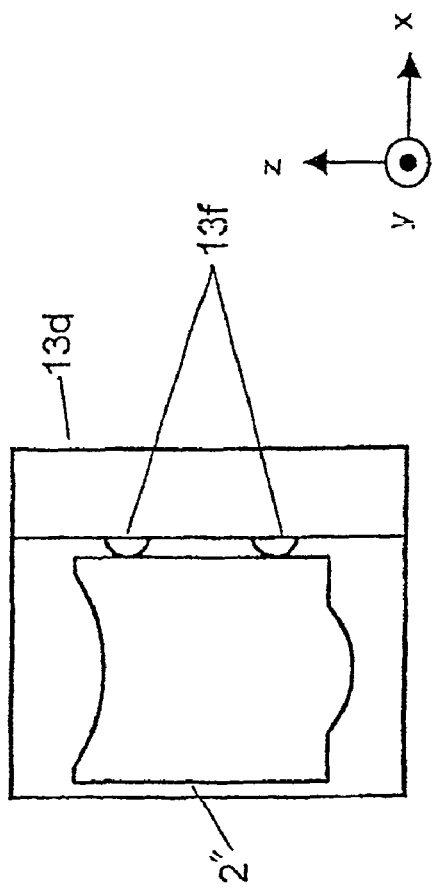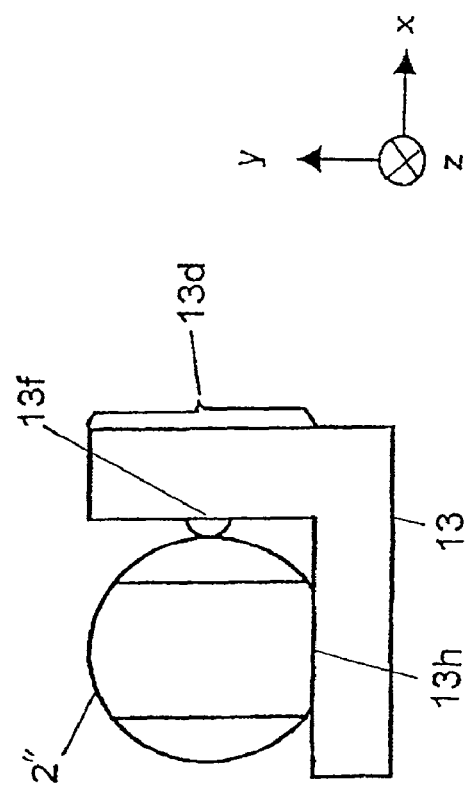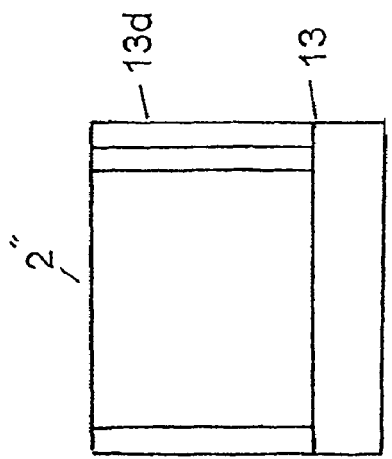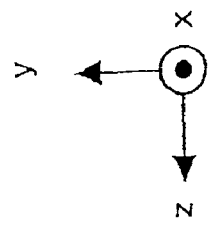

OPTICAL PICKUP, OPTICAL ELEMENT, OPTICAL INFORMATION DEVICE, COMPUTER, OPTICAL INFORMATION MEDIUM PLAYER, CAR NAVIGATION SYSTEM, OPTICAL INFORMATION MEDIUM RECORDER AND OPTICAL DISK SERVER FOR USE WITH A LIGHT SOURCE WHICH EMITS A DIVERGENT BEAM

CROSS-REFERENCE TO RELATED APPLICATIONS

This application is a U.S. national phase application of PCT International Patent Application No. PCT/JP2007/053660 filed Feb. 27, 2007 claiming the benefit of priority of Japanese Patent Application No. 2006-054071 filed Feb. 28, 2006, all of which are incorporated by reference herein in their entirety.

TECHNICAL FIELD

The present invention relates to an optical pickup, an optical element, an optical information device, a computer, an optical information medium player, a car navigation system, an optical information medium recorder and an optical disk server which emit light from the optical pickup to an optical information recording medium to record and/or reproduce information.

BACKGROUND ART

There are various recording media for recording and storing digital audio, images, videos, and document files or data files created on a computer. One of such media is an optical disk. In particular, DVDs (Digital Versatile Disks) have a higher density and a greater capacity than conventional CDs (Compact Discs), and are becoming popular in the field of recording devices as the medium to succeed currently dominant VTRs (Video Tape Recorders). Furthermore, in recent years, research on next-generation optical disks which use a blue-violet semiconductor laser and feature further improved recording density is being carried out at various locations, and its early appearance and penetration are anticipated. Moreover, recording/reproducing data with such optical disks require an optical pickup device.

Generally, an optical pickup that records or reproduces information on an optical disk includes a light source, an objective lens that causes a beam outputted from the light source to be collected on the optical disk, and a detector that detects a beam reflected off of the optical disk.

With a semiconductor laser as the light source, since a beam is emitted from an edge face of a thin active layer, the cross-sectional shape of a beam or, in other words, the shape as seen from an optical axis direction has an elliptical shape having a minor-to-major axis ratio of approximately 1:3. When recording information onto an optical disk, an elliptical beam is desirably shaped into a circular shape from the perspective of improving light use efficiency.

An anomorphic prism or an anomorphic lens is generally used as such beam shaping elements. However, since an anomorphic prism must be used in a parallel light beam obtained by collimating diverging light outputted from a semiconductor laser, downsizing of optical pickups is inhibited. In consideration thereof, by using an anomorphic lens capable of performing beam shaping on a divergent light beam, an increased light use efficiency and a smaller-sized optical pickup can be realized.

On the other hand, other elements that actually constitute an optical pickup include a reflective optical element and an objective lens. However, these elements may generally have astigmatism as an initial characteristic. While a beam shaping element featuring an anomorphic lens characteristically generates astigmatism due to a displacement from a luminous point with respect to a design value, an optical pickup conversely takes advantage of this characteristic and is capable of correcting astigmatism existing in a reflective optical element or an objective lens. Such a configuration enables the quality of spots outputted from the objective lens of an optical pickup and formed on the optical disk to be improved.

FIG. 24 shows a diagrammatic explanatory drawing depicting a configuration of a light source portion of a conventional example of a beam shaping element retaining structure (for example, refer to Japanese Patent Laid-Open No. 2003-178480). FIGS. 24(a) and 24(b) respectively represent an xz cross-sectional view and a yz cross-sectional view.

In the present specification, a direction parallel to the optical axis as seen from a luminous point of the light source shall be referred to as a +z direction, a direction perpendicular to the optical axis and parallel to an optical recording medium as seen from the luminous point shall be referred to as a ±x direction, and a direction perpendicular to both the optical axis and the optical recording medium as seen from the luminous point shall be referred to as a ±y direction. Furthermore, it is assumed that the x axis, the y axis and the z axis are perpendicular to each other.

The light source portion disclosed in Japanese Patent Laid-Open No. 2003-178480 includes a semiconductor laser P that emits an elliptical divergent beam; a beam shaping element L that converts an elliptical divergent beam emitted from the semiconductor laser P into an approximately circular divergent beam; and a retaining member H that integrally retains the semiconductor laser P and the beam shaping element L.

The beam shaping element L is constituted by a cylinder face whose first face (S1) and second face (S2) are both curved only in the x direction, wherein both cylinder faces (S1, S2) are curved so as to be a concave face with respect to the semiconductor laser P only on cross sections having smaller capture angles from the semiconductor laser P (i.e., xz cross sections).

The light source portion of the conventional example described above is designed so as to be able to provide a light source device capable of outputting an light beam that diverges while retaining an approximately circular shape and suppressing wavefront aberrations due to changes in environmental temperature by equalizing distances s and t shown in FIGS. 24(a) and 24(b) and by equalizing linear expansion coefficients of the beam shaping element L and the retaining member H.

Moreover, stable configurations of a beam shaping element include the example described in Japanese Patent Laid-Open No. 2004-247032. This configuration is provided with a shape in which both an incident plane and an output plane are cylindrical planes, and shapes an incident beam having an elliptically shaped cross section into an approximately circular shape by expanding a minor axis direction thereof while retaining its major axis size.

DISCLOSURE OF THE INVENTION

Regarding the practical use of a high-density optical disk using a laser, special emphasis is placed on RIM intensity. A RIM intensity is a ratio of the intensity at a rim with respect to an optical maximum intensity of a light beam having passed an aperture in the vicinity of an objective lens of an optical pickup. An increased RIM intensity is important in improving recording/reproducing quality of information on a high-density optical disk.

However, the conventional optical pickups described in each of the above patent documents do not consider a beam shaping method by a beam shaping element or the position of the beam shaping element within the optical pickup from the perspective of adjusting and increasing RIM intensity.

The present invention has been made in order to solve the above problem, and an object of the present invention is to provide an optical pickup, an optical element, an optical information device, a computer, an optical information medium player, a car navigation system, an optical information medium recorder and an optical disk server intended to adjust/increase RIM intensity using a beam shaping element.

Means to Solve the Problems

The 15th aspect of the present invention is an optical information device comprising:

an optical head device including the optical pickup according to the 21st aspect of the present invention;

a motor which rotates the optical information recording medium; and an electrical circuit which controls and drives the motor, an optical lens and the light source based on a signal obtained from the optical head device.

The 16th aspect of the present invention is a computer comprising:

the optical information device according to the 15th aspect of the present invention;

an input device or an input terminal for inputting information;

a computing device which performs computations based on information inputted from the input device or the input terminal and/or information reproduced from the optical information device; and an output device or an output terminal for displaying or outputting information inputted from the input device or the input terminal and/or information reproduced from the optical information device and/or a result of a computation performed by the computing device.

The 17th aspect of the present invention is an optical information medium player comprising:

the optical information device according to the 15th aspect of the present invention; and an information-to-image decoder which converts an information signal obtained from the optical information device to an image.

The 18th aspect of the present invention is a car navigation system comprising:

the optical information device according to the 15th aspect of the present invention; and an information-to-image decoder which converts an information signal obtained from the optical information device to an image.

The 19th aspect of the present invention is an optical information medium recorder comprising:

the optical information device according to The 15th aspect of the present invention; and an image-to-information encoder which converts image information to information to be recorded by the optical information device.

The 20th aspect of the present invention is an optical disk server comprising:

the optical information device according to The 15th aspect of the present invention; and an input/output terminal which exchanges information with the outside.

The 21st aspect of the present invention is an optical pickup comprising:

a light source which emits a divergent beam having an elliptical far-field pattern;

a beam shaping element having at least one cylindrical plane and which shapes the divergent beam outputted from the light source into an divergent beam having a prescribed shape in which at least the length in the major axis direction of the elliptical shape is shortened;

a light collecting portion which collects the divergent beam having the prescribed shape, which is shaped by the beam shaping element shape on the recording surface of an optical information recording medium so that the optical axis of the divergent beam is perpendicular to the recording surface;

a light detecting portion which detects a beam reflected on the optical information recording medium;

a mounting plate on which the beam shaping element is to be mounted;

an optical axis adjustment holder provided at a position fixed with respect to the light collecting portion and to which the light source is attached; and a light source tilting holder connected to the optical axis adjustment holder so as to be rotationally movable and to which the mounting plate is fixed, wherein a position of the optical axis of the elliptical divergent beam emitted from the light source with respect to the light collecting portion is adjusted by a rotational movement of the light source tilting holder, and the light source tilting holder is adjusted to a position at which an angle formed by the generating line of the cylindrical plane of the beam shaping element and the recording surface of the optical information recording medium becomes equal to the sum of an angle of an emission angle gradient of the elliptical shape of the divergent beam outputted from the light source in the minor axis direction and a right angle.

The 22nd aspect of the present invention is the optical pickup according to the 21st aspect of the present invention, further comprising:

a first outer shell portion provided so as to cover a part of the periphery of the beam shaping element the first outer shell portion being fixed to a part of the periphery of a side wall of the beam shaping element; and a second outer shell portion provided so as to cover a part of the periphery of the first outer shell portion and a part of the periphery of the beam shaping element, the second outer shell portion including a contact portion at which the second outer shell portion comes into contact with a part of the periphery of the first outer shell portion and another part of the periphery of the side wall of the beam shaping element so as to be slidingly movable; wherein the second outer shell portion includes a gap which exposes the surface of the first outer shell portion to the outside, the first outer shell portion includes a knob portion which protrudes from the gap of the second outer shell portion and can be operated from the outside, the contact portion of the second outer shell portion has a structure regulating the beam shaping element so as to prevent the beam shaping element from moving in a direction perpendicular to the optical axis direction thereof, and the beam shaping element is mounted to the mounting plate via the second outer shell portion.

The 23$^{rd}$ aspect of the present invention is the optical pickup according to the 22$^{nd}$ aspect of the present invention, wherein the contact portion of the second outer shell portion includes a first side wall which comes into plane contact with the first outer shell portion, a second side wall which applies elastic force to the first outer shell portion, and a third side wall which comes into either point contact or line contact with the beam shaping element, the first side wall, the second side wall and the third side wall are formed in a direction parallel to the optical axis of the beam shaping element, and the gap is provided on the second side wall.

The 24$^{th}$ aspect of the present invention is the optical pickup according to the 22$^{nd}$ aspect of the present invention, wherein of the first outer shell portion and the second outer shell portion, paint is applied to at least a part at which the first side wall of the contact portion of the second outer shell portion comes into contact with the first outer shell portion, and a part at which the third side wall of the contact portion of the second outer shell portion comes into contact with the beam shaping element.

The 25$^{th}$ aspect of the present invention is the optical pickup according to the 24$^{th}$ aspect of the present invention, wherein the contact portion of the second outer shell portion includes a first side wall which comes into plane contact with the first outer shell portion, a second side wall which applies elastic force to the first outer shell portion, and a third side wall which comes into either point contact or line contact with the beam shaping element, the first side wall, the second side wall and the third side wall are formed in a direction parallel to the optical axis of the beam shaping element, and the gap is provided on the second side wall.

The 26$^{th}$ aspect of the present invention is the optical pickup according to the 22$^{nd}$ aspect of the present invention, wherein the second outer shell portion comprises the two members of:

a beam shaping element holder including the first side wall and the third side wall; and an elastic body including the second side wall, further wherein the elastic body and the beam shaping elements holder sandwich the mounting plate so as to come into contact with each other.

The 27$^{th}$ aspect of the present invention is the optical pickup according to the 21$^{st}$ aspect of the present invention, wherein the beam shaping element is fixed to the mounting plate by an adhesive.

The 28$^{th}$ aspect of the present invention is the optical pickup according to the 21$^{st}$ aspect of the present invention, wherein the light source tilting holder and the mounting plate are integrally formed.

The 29$^{th}$ aspect of the present invention is the optical pickup according to the 21$^{st}$ aspect of the present invention, wherein the beam shaping element is fixed to the light source tilting holder by an adhesive.

The 30$^{th}$ aspect of the present invention is the optical pickup according to the 21$^{st}$ aspect of the present invention, comprising:

an optical base on which the light collecting portion is disposed, wherein a recessed portion or a through-hole is formed on the optical base in which a part of the mounting plate and members mounted on the mounting plate is capable of moving when performing tilting adjustment on the light source tilting holder.

The 31$^{st}$ aspect of the present invention is an optical pickup comprising:

a light source which emits a divergent beam having an elliptical far-field pattern;

a beam shaping element having at least one cylindrical plane and which shapes the divergent beam emitted from the light source into an divergent beam having a prescribed shape in which at least the length in the major axis direction of the elliptical shape is shortened;

a light collecting portion which collects the divergent beam having the prescribed shape, which is shaped by the beam shaping element shape on the recording surface of an optical information recording medium so that the optical axis of the divergent beam is perpendicularly to the recording surface;

a light detecting portion which detects the beam reflected on the optical information recording medium, wherein the light collecting portion rotates the optical axis of the divergent beam so that the direction in which the major axis of the divergent beam having a prescribed shape is shortened conforms to the radial direction of the optical information recording medium.

The 32$^{nd}$ aspect of the present invention is the optical pickup according to the 21$^{st}$ aspect of the present invention, wherein a contraction rate of the elliptical shape during the shaping by the light collecting portion is smaller than an emission angle ratio of the light source.

The 33$^{rd}$ aspect of the present invention is the optical pickup according to the 21$^{st}$ aspect of the present invention, wherein a contraction rate of the elliptical shape during the shaping by the light collecting portion is smaller than an emission angle ratio of the light source.

The 34$^{th}$ aspect of the present invention is the optical pickup according to the 21$^{st}$ aspect of the present invention, wherein a width of a divergent beam having the prescribed shape after subjected to shaping by the beam shaping element in the same direction as the major axis direction of the divergent beam having the elliptical shape prior to shaping is longer than a width in the same direction as the minor axis direction of the divergent beam having the elliptical shape prior to shaping.

ADVANTAGE OF THE INVENTION

The present invention provides an optical pickup, an optical element, an optical information device, a computer, an optical information medium player, a car navigation system, an optical information medium recorder and an optical disk server capable of adjusting/increasing RIM intensity using a beam shaping element.

BRIEF DESCRIPTION OF THE DRAWINGS

FIG. 5(a) is a diagram explaining a displacement in the y axis direction due to a temperature change in a conventional optical pickup, and FIG. 5(b) is a diagram explaining a displacement in the y axis direction due to a temperature change in the optical pickup according to the second embodiment of the present invention;

FIG. 7(a) is an xz plane front view showing a relationship between gradients of a light source element and a beam shaping element of the optical pickup according to the third embodiment of the present invention, and FIG. 7(b) is an yz plane cross-sectional view showing a relationship between gradients of the light source element and the beam shaping element of the optical pickup according to the third embodiment of the present invention;

FIG. 10(a) is a plan view of another configuration example of the beam shaping element and the mounting portion of the optical pickup according to the third embodiment of the present invention as seen from the zx plane, FIG. 10(b) is a front view of the other configuration example of the beam shaping element and the mounting portion of the optical pickup according to the third embodiment of the present invention as seen from the yx plane, and FIG. 10(c) is a side view of the other configuration example of the beam shaping element and the mounting portion of the optical pickup according to the third embodiment of the present invention as seen from the yz plane;

FIG. 12(a) is a plan view of another configuration example of the beam shaping element and the mounting portion of the optical pickup according to the third embodiment of the present invention as seen from the zx plane, FIG. 12(b) is a front view of the other configuration example of the beam shaping element and the mounting portion of the optical pickup according to the third embodiment of the present invention as seen from the yx plane, and FIG. 12(c) is a side view of the other configuration example of the beam shaping element and the mounting portion of the optical pickup according to the third embodiment of the present invention as seen from the yz plane;

FIG. 15(a) is a plan view of another configuration example of the beam shaping element and the mounting portion of the optical pickup according to the third embodiment of the present invention as seen from the zx plane, FIG. 15(b) is a front view of the other configuration example of the beam shaping element and the mounting portion of the optical pickup according to the third embodiment of the present invention as seen from the yx plane, and FIG. 15(c) is a side view of the other configuration example of the beam shaping element and the mounting portion of the optical pickup according to the third embodiment of the present invention as seen from the yz plane;

DESCRIPTION OF SYMBOLS

Figure 1A:
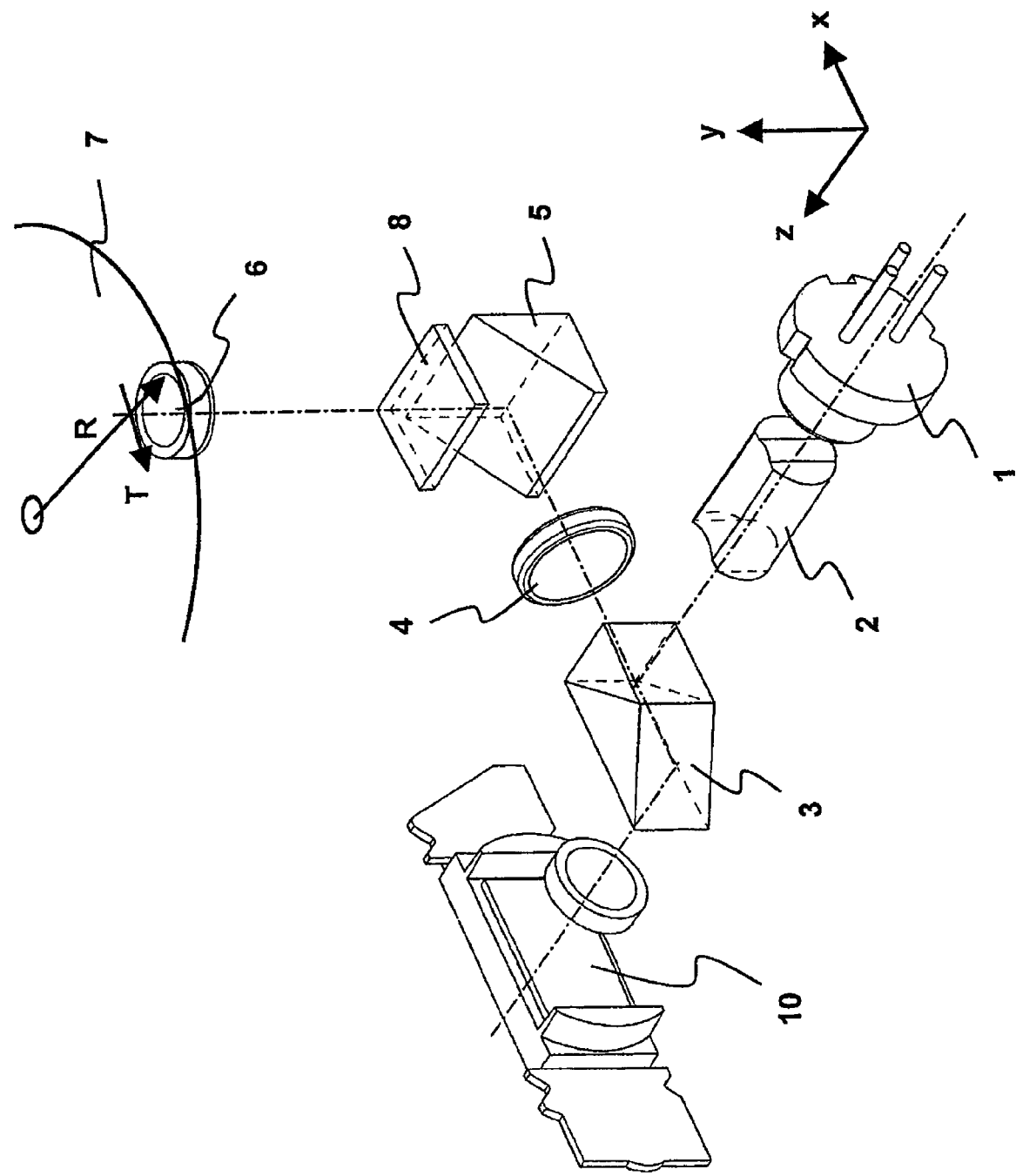
FIG. 1(a) is a diagrammatic explanatory drawing showing a configuration of an optical pickup according to a first embodiment of the present invention.

1 Laser light source
2, 2', 2" Beam shaping element
3 Beam splitter
4 Collimating lens
5 Erecting mirror
6 Objective lens
6a Aperture
7 Optical disk
8 Quarter wavelength plate
9 Lens holder
10 Light detector
11 Light source tilting holder
12 Optical axis adjustment holder
13 Mounting plate
21 Beam shaping element holder
22 Beam shaping element retaining spring
23 Adjusting knob
25 Extension member
2i, 2i' Light ray incident plane of beam shaping element
2o, 2o' Light ray output plane of beam shaping element
2im, 2im' Incident plane-side generating line of beam shaping element
2om, 2om' Output plane-side generating line of beam shaping element
2z Optical center line of beam shaping element
2ic, 2ic' Base radius center point of incident cylindrical plane of beam shaping element
2oc, 2oc' Base radius center point of output cylindrical plane of beam shaping element
2S Plane including optical center line of beam shaping element
2h Fixed position of beam shaping element
211 Contact portion (ridge line) of beam shaping element and beam shaping element holder
212 Contact portion of beam shaping element and beam shaping element holder
213 Contact portion (contact plane) of beam shaping element holder and mounting plate
51 Erecting prism having two reflecting surfaces
100 Optical head
101 Optical disk
102 Turntable
103 Clamper
104 Motor
105 Traverse
106 Control circuit
107 Optical disk drive
110 Personal computer
112, 121, 142 Monitor
113, 143 Keyboard
120 Optical disk recorder
130, 151 Liquid crystal monitor
131 Optical disk player
140 Server
144 Network
150 Car navigation system
200 Optical system having at least two or more different wavelengths as a light source

BEST MODE FOR CARRYING OUT THE INVENTION

Embodiments of the present invention will now be described with reference to the drawings.

First Embodiment

FIG. 1(a) is a diagrammatic explanatory drawing showing a configuration of an optical pickup according to a first embodiment of the present invention.

In FIG. 1(a), reference numeral 1 denotes a laser light source that emits a laser light with wavelength λ (390 nm to 420 nm: a representative wavelength of 405 nm is assumed); 2 a beam shaping element that shapes a far-field pattern of the laser light; 3 a beam splitter that splits an optical path; 4 a collimating lens; 5 an erecting mirror that bends an optical axis; and 6 an objective lens (optical lens). The laser light source 1, the beam shaping element 2, the beam splitter 3, the collimating lens 4, the erecting mirror 5 and the objective lens 6 are disposed on a same optical base (not shown) formed by metal or resin.

Reference numeral 7 denotes an optical disk whose substrate thickness t1 is equal to or less than approximately 0.1 mm and on which recording/reproducing is performed by a light beam with wavelength λ. With the optical disk 7 in FIG. 1(a), only a substrate from a light incident plane to a recording surface is shown. In reality, the optical disk 7 is created by gluing the same together with a protective plate so that the mechanical strength of the optical disk 7 is reinforced and an outer shape of the optical disk 7 is adjusted to equal 1.2 mm that is the same as a CD. However, for brevity, a protective member is omitted from the respective drawings of the present invention. The optical disk 7 serves as an example of the optical information recording medium according to the present invention.

By preferably using a semiconductor laser light source as the laser light source 1, reductions in size, weight and power consumption may be achieved in an optical pickup as well as in an optical information device using the same.

Figure 1B:
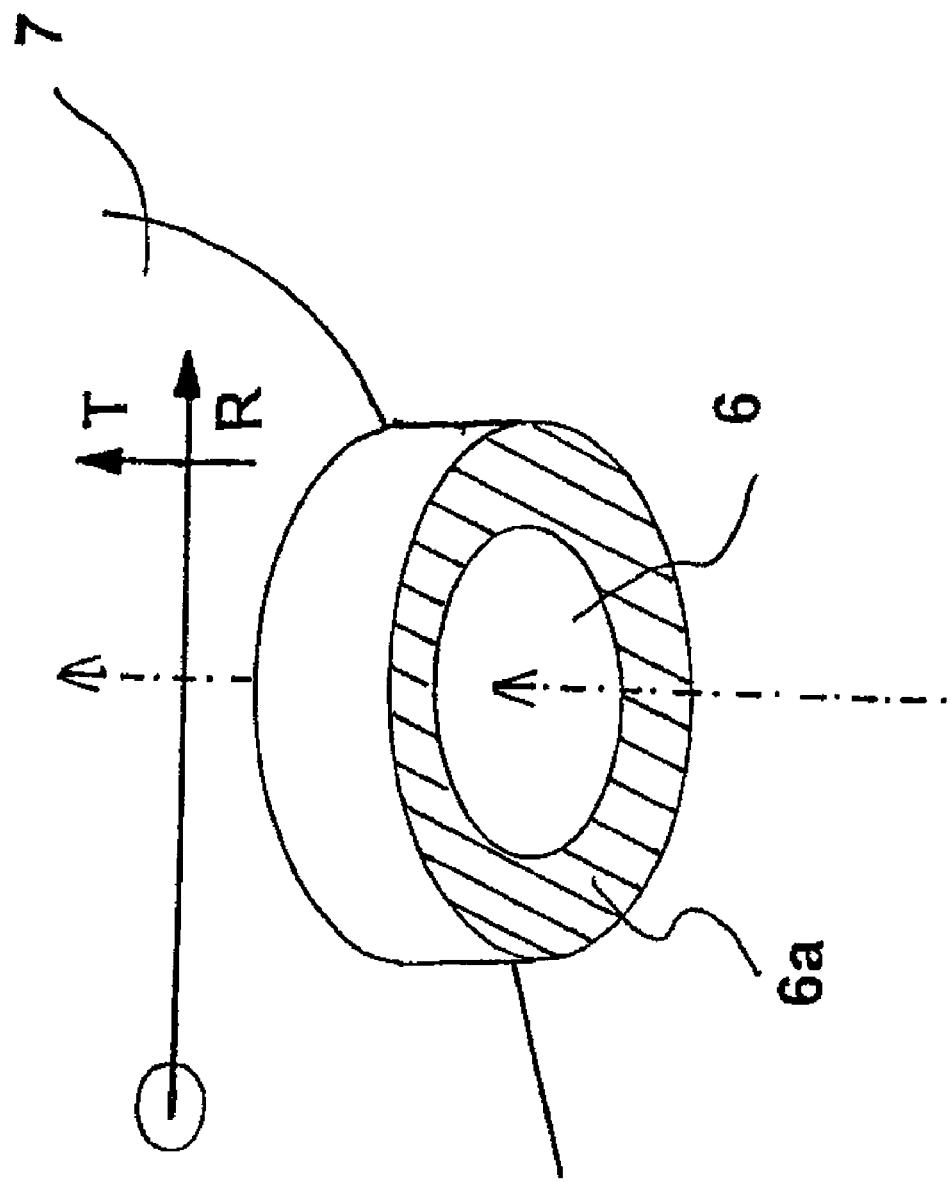
FIG. 1(b) is an explanatory drawing showing a configuration of the vicinity of an objective lens of the optical pickup according to the first embodiment of the present invention.

When performing recording and reproducing on the optical disk 7, a blue light beam with wavelength λ emitted from the laser light source 1 is shaped by the beam shaping element 2, reflected off of the beam splitter 3, collimated into approximately parallel light by the collimating lens 4, has its optical axis bent by the erecting mirror 5, and is changed to circularly polarized light by the quarter wavelength plate 8. Subsequently, the blue light beam is collected by the refracting objective lens 6 through the substrate of the optical disk 7 on the information recording surface. Moreover, as shown in FIG. 1(b), an aperture 6a represented by the shaded portion in the diagram and which utilizes a member covering a small end portion of the objective lens 6 is provided on a side of the objective lens 6 opposing the quarter wavelength plate 8, whereby incident light is aperture-limited and then guided to the optical disk 7.

The configuration combining the beam splitter 3, the collimating lens 4, the erecting mirror 5, the quarter wavelength plate 8 and the refracting objective lens 6 and which collects light rays shaped by the beam shaping element 2 onto the optical disk 7 serves as an example of the light collecting portion according to the present invention.

The blue light beam reflected off of the information recording surface of the optical disk 7 follows the original optical path in reverse (return leg) and is changed to a straight polarized light that is perpendicular with respect to its initial stage by the quarter wavelength plate 8, has its focal distance extended by the collimating lens 4, transmitted through and reflected off of the beam splitter 3, and is incident to the light detector 10. An output of the light detector 10 is computed to obtain a servo signal used for focal control and tracking control and an information signal. As described above, the beam splitter 3 is an optical path branching element having a polarization separation thin film which, with respect to a light beam having wavelength λ, totally reflects straight polarized light in one direction and totally transmits straight polarized light in a direction perpendicular thereto. The light detector 10 serves as an example of the detecting portion according to the present invention.

Figure 1C:
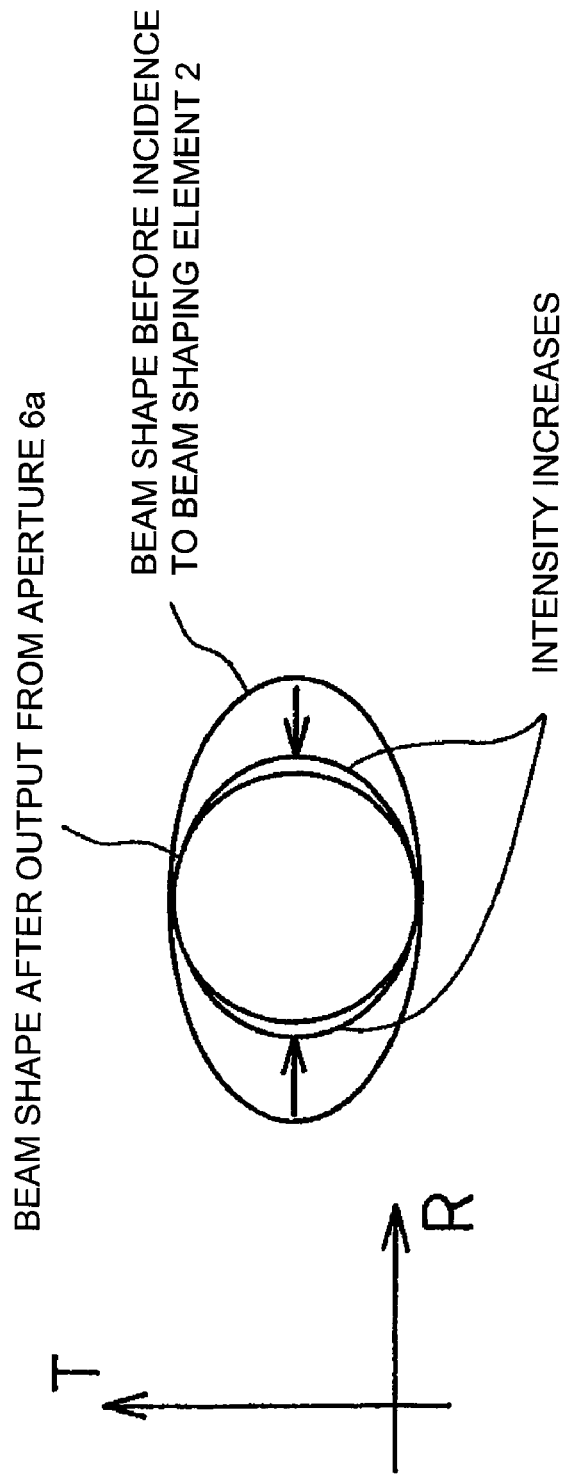
FIG. 1(c) is an enlarged configuration diagram of a beam shaping element of the optical pickup according to the first embodiment of the present invention.

Next, an enlarged configuration diagram of the beam shaping element 2 of the optical pickup according to the present first embodiment is shown in FIG. 1(c).

The beam shaping element 2 is a lens whose incident plane 2i and output plane 2o are both configured as a cylindrical plane. Reference character 2im represents a generating line constituted by a set of points obtained by expanding a point on a lens plane in the y direction when viewing the incident plane 2i from an xz cross section, and in a similar manner, reference character 2om represents a generating line constituted by a set of points obtained by expanding a point on a lens plane in the y direction when viewing the output plane 2o from an xz cross section. Generally, when configuring the beam shaping element with two cylindrical planes, problems such as an optical aberration are unlikely to occur when 2im and 2om are approximately parallel to each other.

The beam shaping element 2 performs beam shaping so that an elliptical shape of a far-field pattern emitted from the laser light source 1 changes to an approximately circular shape.

Figure 1D:
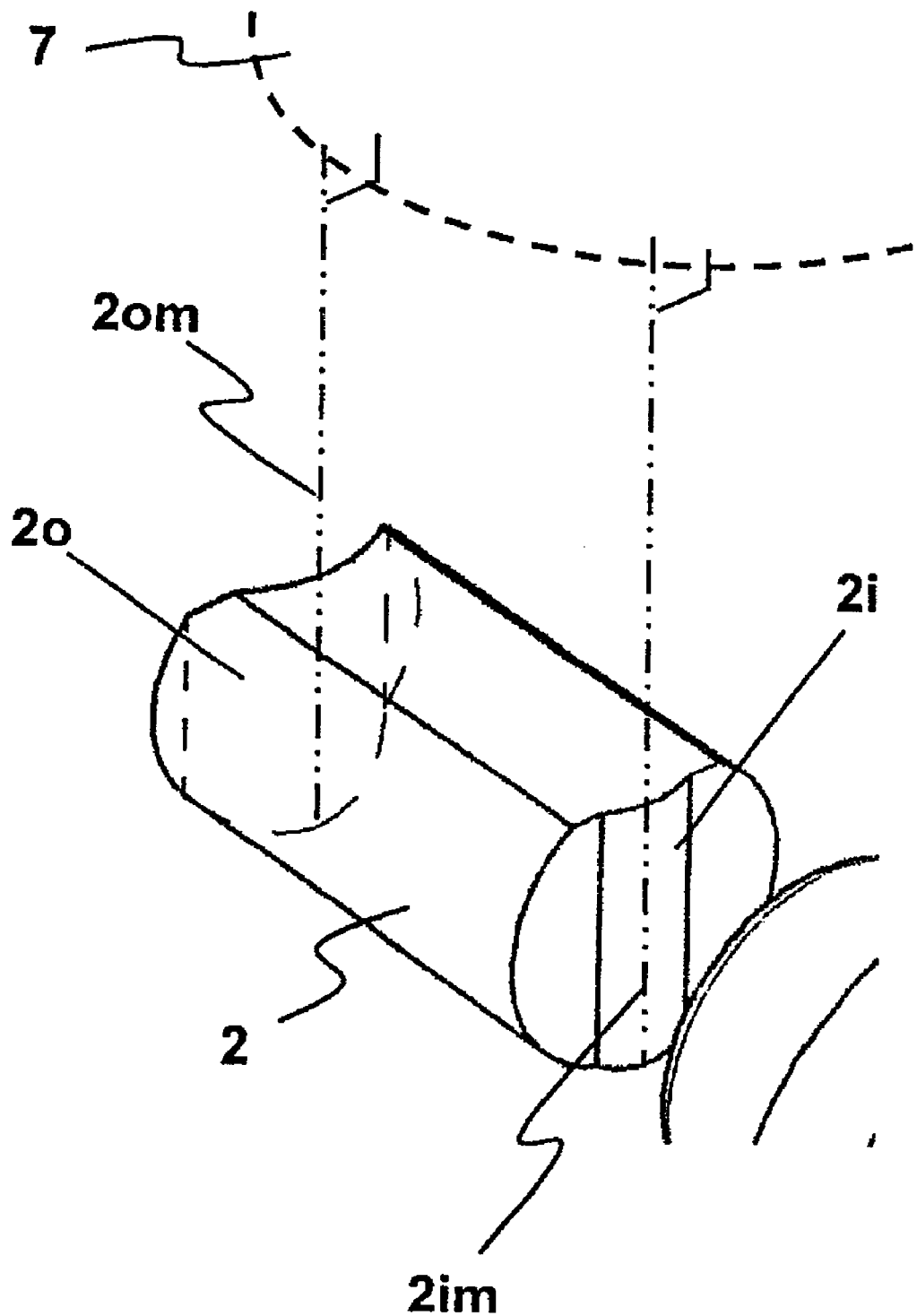
FIG. 1(d) is a diagram for explaining the effects of the beam shaping element of the optical pickup according to the first embodiment of the present invention.

Particularly, as shown in FIG. 1(d), the present first embodiment is characterized in that the beam shaping element 2 performs shaping on an elliptical cross-sectional shape of an incident light beam with respect to the optical axis thereof so as to approach an approximately circular shape by shortening the major axis direction of the elliptical shape.

This produces the following effects. Firstly, the beam shaping element 2 is an contractionary optical part that performs shaping for contracting a light beam shape. Consequently, since the light quantity per unit area in a peripheral portion of light increases, the RIM intensity of light beam passing through the approximately circular aperture Ga and which is incident to the objective lens 6 (in this case, the ratio of the intensity at rim with respect to an optical maximum intensity of light beam passing through the aperture 6a) also increases.

Light shaping performed by the beam shaping element 2 desirably results in a shape after shaping that is elliptical to the extent that the shape is not perceived as being substantially circular.

This is due to the following reasons. That is, when the power factor of beam shaping increases, a relative displacement occurs between the beam shaping element and the luminous points of the light source, which in turn causes astigmatism. Generally, the blue-violet semiconductor laser 1 as a light source has an emission angle of θ//:8°, θ⊥20°, and an emission range ratio of 2.5.

Therefore, by abstaining from performing beam shaping that results in a greater emission angle ratio or, in other words, intense shaping that changes a beam to a perfect circular shape or an elliptical shape in which the major and minor axes prior to shaping replace each other, RIM intensity can be increased while avoiding occurrences of astigmatism.

In addition, the adoption of a contractionary system enables an optical path length of the optical system of an approach leg from the laser light source 1 to the optical disk 7 which form the light collecting portion to be shortened. Accordingly, an effect is achieved in that the optical system of the optical pickup can be downsized which, in turn, enables the optical pickup itself to be downsized.

The approximately circular shaped beam obtained by shaping an elliptical shape beam emitted from the laser light source 1 by the beam shaping element 2 serves as an example of the divergent beam having a prescribed shape according to the present invention.

Furthermore, by configuring the present first embodiment so that, on the approach leg, the optical path is bent by reflection off of the beam splitter 3 and the optical path is caused to be incident to the erecting mirror 5 from a tangential direction (represented as T-directions in FIGS. 1(a) to 1(c)) of the optical disk 7, the optical axis of the light beam is rotated so as to make the light shaping direction by the beam shaping element 2 conform to a radial direction (represented as R-directions in FIGS. 1(a) to 1(c)) of the optical disk 7.

This further achieves the following effects with respect to increasing RIM intensity. That is, when dividing RIM intensity into the aforementioned radial direction and the tangential direction, by arranging the radial-direction RIM intensity to be higher than the tangential-direction RIM intensity, the influence of reflected light from regions outside of a recording track to become a recording or reproducing object on the information recording surface and, in particular, the influence of reflected light from an adjacent recording track arranged in a track direction can be removed and a better recording/reproducing characteristic can be achieved. This is particularly advantageous when recording or reproducing on a high-density disk with a narrow track pitch.

Moreover, in the present embodiment, the generating lines 2*im* and 2*om* of the beam shaping element 2 are disposed so as to be approximately perpendicular with respect to the recording surface of the optical disk 7.

In a conventional optical pickup, the center line of the curvature of a cylindrical plane of a beam shaping element is not in a perpendicular relationship with the recording surface of an optical disk, and the beam shaping element and the optical disk are disposed so as to have a certain gradient therebetween. In order to increase RIM intensity, it is desirable that light rays are collected accurately perpendicular to the recording surface of the optical disk. However, in order to do so, the respective optical members disposed between the beam shaping element and the optical disk must be designed in advance in consideration of the aforementioned gradient between the beam shaping element and the optical disk. Consequently, it becomes difficult to design the respective optical members disposed between the beam shaping element and the optical disk so that light rays are collected accurately perpendicular to the recording surface of the optical disk.

In contrast thereto, in the present embodiment, the generating lines 2*im* and 2*om* which are center lines of the curvatures of cylindrical planes of the beam shaping element 2 are disposed so as to have, in advance, a perpendicular relationship with the recording surface of the optical disk 7. Therefore, the respective optical members to be disposed between the beam shaping element 2 and the optical disk 7 can be designed in an easy manner.

As described above, with the present embodiment, an increase in RIM intensity can be achieved by using a contractionary beam shaping element 2 and configuring the light collecting system so as to rotate the optical axis of the aforementioned divergent beam so that the major axis direction in which a light collecting ratio increases due to contractionary deformation conforms to the radial direction of the optical disk 7.

Figures 2A, 2B:
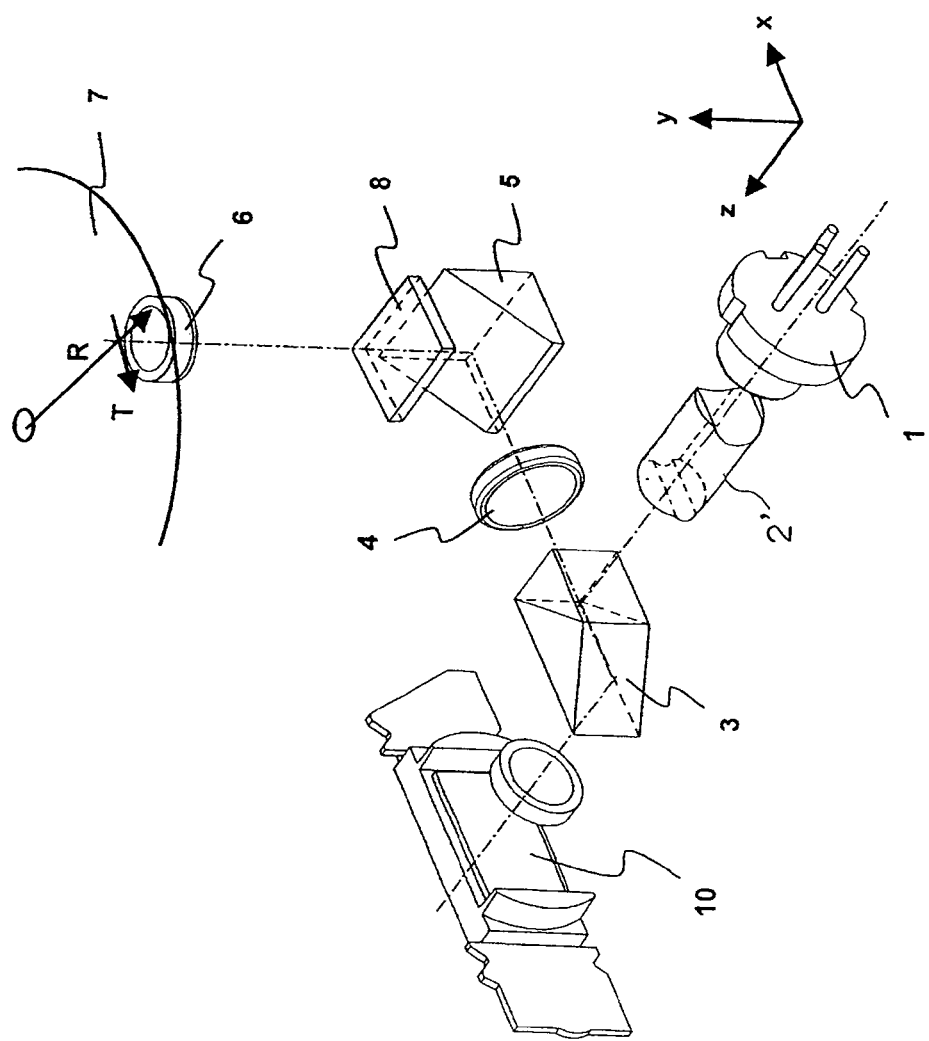
FIG. 2(a) is a diagrammatic explanatory drawing showing another configuration of the optical pickup according to the first embodiment of the present invention.
FIG. 2(b) is an enlarged configuration diagram showing the other configuration example of the beam shaping element of the optical pickup according to the first embodiment of the present invention.

While the use of the contractionary beam shaping element 2 is assumed in the above description, an expansional beam shaping element such as that described in Japanese Patent Laid-Open No. 2004-247032 may be used instead. The configuration example shown in FIG. 2(*a*) uses an expansional beam shaping element 2' in place of the contractionary beam shaping element 2 shown in FIG. 1(*a*). As shown in FIG. 2(*b*), the beam shaping element 2' is a lens whose incident plane 2*i*' and output plane 2*o*' are both configured as a cylindrical plane. Reference character 2*im*' represents a generating line constituted by a set of points obtained by expanding a point on a lens plane in the y direction when viewing the incident plane 2*i*' that is a cylindrical plane from an xz cross section, and in a similar manner, reference character 2*om*' represents a generating line constituted by a set of points obtained by expanding a point on a lens plane in the y direction when viewing the output plane 2*o*' that is a cylindrical plane from an xz cross section. The incident plane 2*i*' of the beam shaping element 2' and the output plane 2*o* of the beam shaping element 2 differ from each other only in their orientations, and share the same curvature. In a similar manner, the output plane 2*o*' of the beam shaping element 2' and the incident plane 2*i* of the beam shaping element 2 differ from each other only in their orientations, and share the same curvature.

In addition, generating lines 2*im*' and 2*om*' of the beam shaping element 2' are perpendicular to the generating lines 2*im* and 2*om* of the beam shaping element 2.

When using the beam shaping element 2' arranged as described above, since an intensity distribution on a cross section of light beam after shaping is perpendicular to that when using the beam shaping element 2, light beam forming a luminous spot on the optical disk 7 is expanded in the tangential direction of the optical disk 7 while the shape thereof prior to shaping is retained in the radial direction. Consequently, RIM intensity in the radial direction is retained.

In the present embodiment, from the perspectives of assemblability and the like, the beam shaping element 2 desirably contacts the optical base on a plane approximately parallel to the recording surface of the optical disk 7 on a side not opposing the optical disk 7. This is due to the following reasons.

For example, the configuration presented in Japanese Patent Laid-Open No. 2003-178480 described in Background Art is a configuration which only takes into consideration astigmatism caused by a change in the distance between the beam shaping element and a luminous point due to temperature change.

Figure 24A:
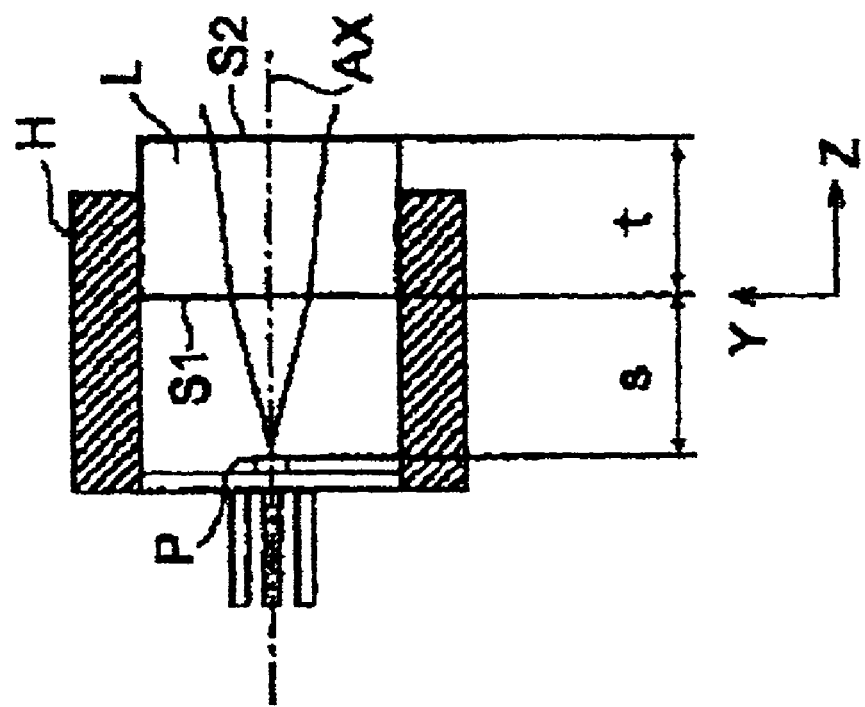
FIG. 24(a) is an xz cross-sectional view showing a configuration example of a light source portion of a conventional optical pickup.
Figure 24B:
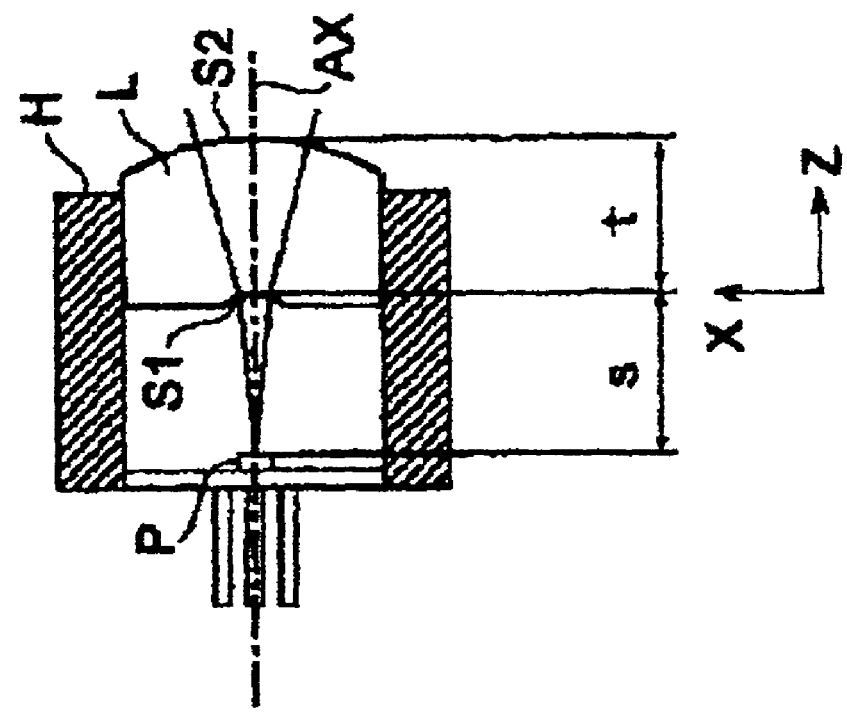
FIG. 24(b) is a yz cross-sectional view showing the configuration example of the light source portion of the conventional optical pickup.

In the case of this conventional configuration, for example, when the temperature changes, a displacement in the positional relationship between the luminous point and the beam shaping element may occur with respect to a direction perpendicular to the optical axis and in which the beam shaping element has a lens effect or, in other words, an ±x direction (hereinafter simply referred to as the x direction) as shown in FIG. 24(*a*). Since the beam shaping element has a lens effect in the x direction, an occurrence of a displacement in the positional relationship between the luminous point and the beam shaping element with respect to the x direction causes an incline of the optical axis of a light ray emitted from the luminous point or a displacement of the center of the light intensity distribution in a far-field pattern of the light ray.

Although a displacement in the positional relationship between the luminous point and the beam shaping element may also occur with respect to a direction perpendicular to the optical axis and in which the beam shaping element does not have a lens effect or, in other words, a ±y direction (hereinafter simply referred to as the y direction) as shown in FIG. 24(*b*), since the beam shaping element does not have a lens effect in the y direction, it is unlikely that an occurrence of a displacement will give rise to an optical problem.

According to the present embodiment, by adopting the configuration described above, even if the ambient temperature of the optical pickup changes and parts such as the optical base expand or contract due to heat, the beam shaping element 2 will only cause a displacement in the y direction and a displacement is unlikely to occur in the x direction in which the beam shaping element 2 has a lens effect exists. Therefore, an x direction displacement in the positional relationship with the laser light source 1 having a luminous point can be minimized even with respect to a temperature change, and deterioration in the optical characteristic of the optical pickup such as an inclining of the optical axis or a displacement of the center of the light intensity distribution of a far-field pattern can be suppressed.

The contact between the beam shaping element 2 and the optical base need not be planar and may take the form of a plurality of points or lines. In this case, an effect similar to the case where the contact portion is planar may be achieved if a plane including the points or lines is approximately parallel to the recording surface of the optical disk 7. In this case, a configuration is provided in which a plane formed by the contact portion with the optical base among the exterior shape of the beam shaping element 2 is approximately perpendicular to the generating line 2*im* or 2*om*.

In addition, with the beam shaping element 2, while the generating lines 2*im* and 2*om* are typically arranged to be parallel to each other in order to prevent occurrences of astigmatism, supposing that the generating lines 2im and 2om are not parallel to each other, a configuration may also suffice in which the generating line of either the incident plane 2i or the output plane 2o and, in particular, the generating line of the plane on whichever side that plays a significant role in the beam shaping lens effect is approximately perpendicular on the optical pickup to the recording surface of the optical disk 7, in which case the aforementioned effect of suppressing deterioration in the optical characteristic of the optical pickup with respect to temperature change may be similarly achieved.

In the aforementioned configuration in correspondence to temperature change, the generating line direction of the beam shaping element 2 need not necessarily be perpendicular to the recording surface of the optical disk 7, and an angle formed thereby may deviate from 90 degrees by $\theta z$. This is because, for example, since the influence of an x direction component due to expansion of the optical base during a temperature change is around $\sin \theta z$, such an influence is minimal and therefore can be ignored if $\theta z$ is a few degrees and the same effect as a case where the whole angle $\theta$ is 90 degrees can be achieved.

Furthermore, in the present first embodiment, while a case where the beam shaping element 2 has two cylindrical planes has been described, a similar effect can be achieved using a beam shaping element having only one cylindrical plane.

Moreover, while the present first embodiment is configured as described above because, on an approach leg, an emitted light from the laser light source 1 shown in FIG. 1(a) has its optical path bent by reflection off of the beam splitter 3 and is incident to the erecting mirror 5 from a tangential direction, this configuration further achieves the following effect.

Figure 3:
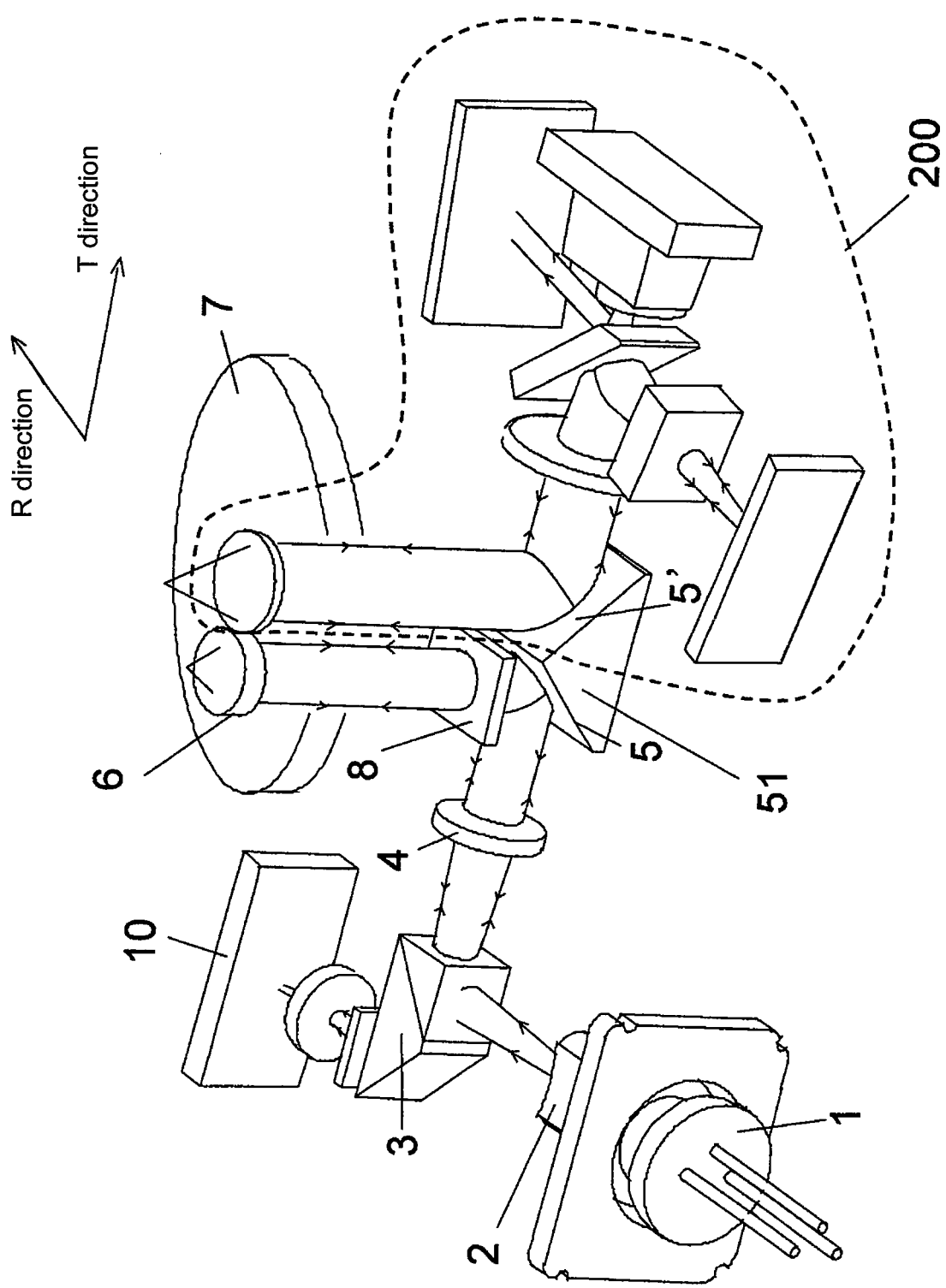
FIG. 3 is a diagrammatic explanatory drawing showing a configuration in which the first embodiment of the present invention has been used in an optical pickup having a multi-wavelength light source.

FIG. 3 shows a diagrammatic explanatory drawing depicting a configuration of an optical pickup having a general multi-wavelength light source.

As shown in FIG. 3, in the case where light is incident to the erecting mirror 5 from a tangential direction, with an optical pickup constituting a pickup including a laser light source 1 having at least two or more different wavelengths and which forms a luminous spot on an optical disk 7 using at least two or more objective lens 6, since the optical pickup may be configured by a triangular erecting prism 51 having at least two reflecting surfaces when a face 5' corresponding to an erecting mirror in an optical path of an optical system 200 having a light source of a different wavelength is arranged to face the erecting mirror 5 as shown in FIG. 13, an advantage is gained in that the number of parts can be reduced. In this case, due to spatial restrictions existing between a spindle motor supporting the optical disk 7, and incidence to the erecting prism (mirror) 51 in a tangential direction is advantageous.

Moreover, in the configuration according to the present first embodiment, an adjustment achieving an increase in the radial direction RIM intensity is possible in principle even in the case where the major axis direction of the ellipse of the far-field pattern of outputted light from the laser light source 1 is caused to conform to the tangential direction instead of to the radial direction. In this case, while a beam shaping power factor at a level in which the major axis of the ellipse of the far-field pattern of outputted light from the laser light source 1 is shortened in comparison to the minor axis (the major and minor axes are interchanged) becomes necessary, excessively increasing the beam shaping power factor makes it difficult to design a lens with sufficiently low aberration and makes the occurrence amount of optical aberrations due to relative displacement of a luminous point and the beam shaping element 2 too great. Therefore, there may be cases where handling becomes difficult.

In addition, by making the radial direction of the optical disk 7 conform to the major axis direction of an ellipse of a far-field pattern of outputted light from the light source 1, the length of the major axis with respect to the minor axis of the far-field pattern after beam shaping changes as the beam shaping power factor of the beam shaping element 2 changes due to lens design. As a result, the radial direction RIM intensity can substantially be increased.

Furthermore, in the above description, the aperture 6a is assumed to be provided using a member that covers a small end portion of the objective lens 6. However, as long as the objective lens 6 is capable of limiting incident light so as to satisfy a desired numerical aperture (as an example, 0.85 in the case of a blue-violet laser), the aperture is not limited to any specific shape thereof. For example, the aperture may be realized by providing a plate-like member on an edge portion of the small end portion of the objective lens 6, the incident plane or the output plane, or may be formed by applying paint.

Second Embodiment

Figure 4B:
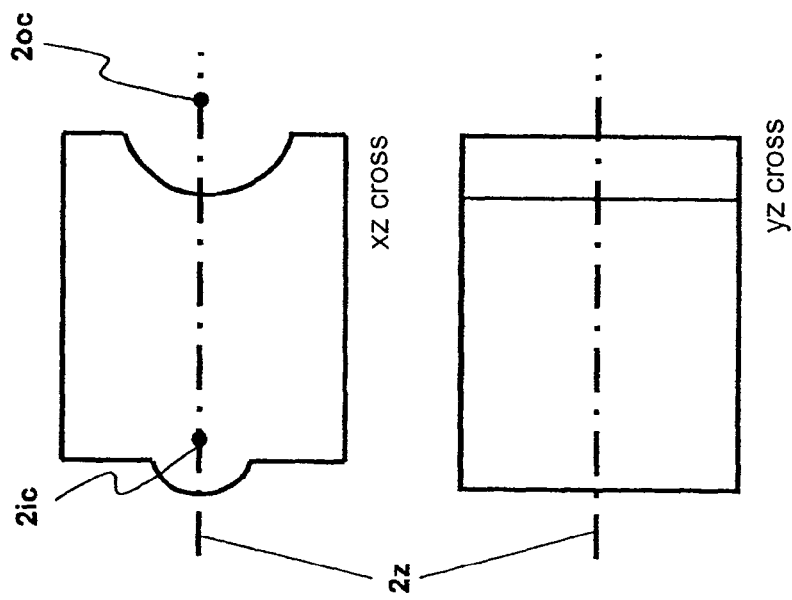
FIG. 4(b) is an xz cross section and an yz cross section of the beam shaping element of the optical pickup according to the second embodiment of the present invention.
Figure 4A:
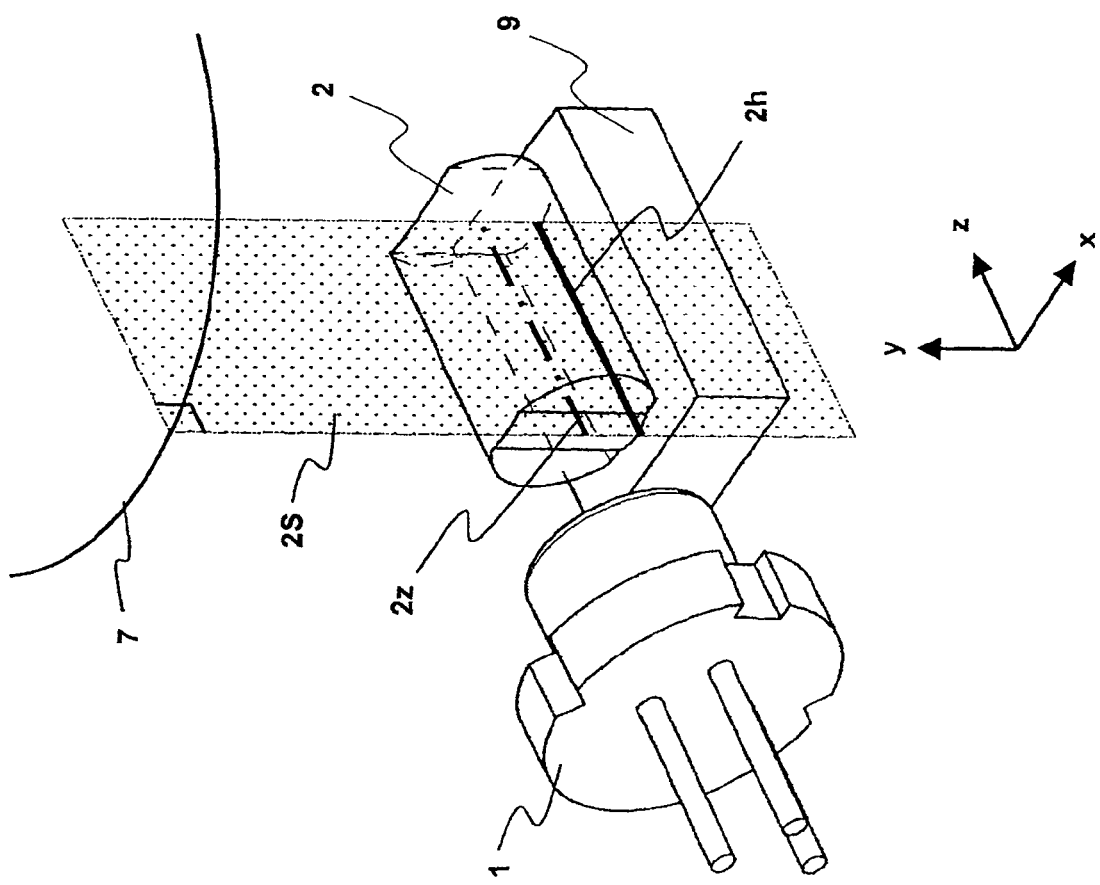
FIG. 4(a) is a diagrammatic explanatory drawing showing a configuration of a beam shaping element fixing portion of an optical pickup according to a second embodiment of the present invention.

FIG. 4(a) is a diagrammatic explanatory drawing showing a configuration of a fixing portion of a beam shaping element 2 among a configuration of an optical pickup according to a second embodiment of the present invention. In FIG. 4(a), like components to that shown in FIG. 1 are assigned like reference characters and descriptions thereof shall be omitted. In FIG. 4(a), at least a portion of the exterior shape of the beam shaping element 2 contacts a lens holder 9 as a contact portion.

In addition, FIG. 4(b) shows an xz cross sectional diagram and a yz cross sectional diagram of the beam shaping element 2 according to the present second embodiment.

Figure 6:
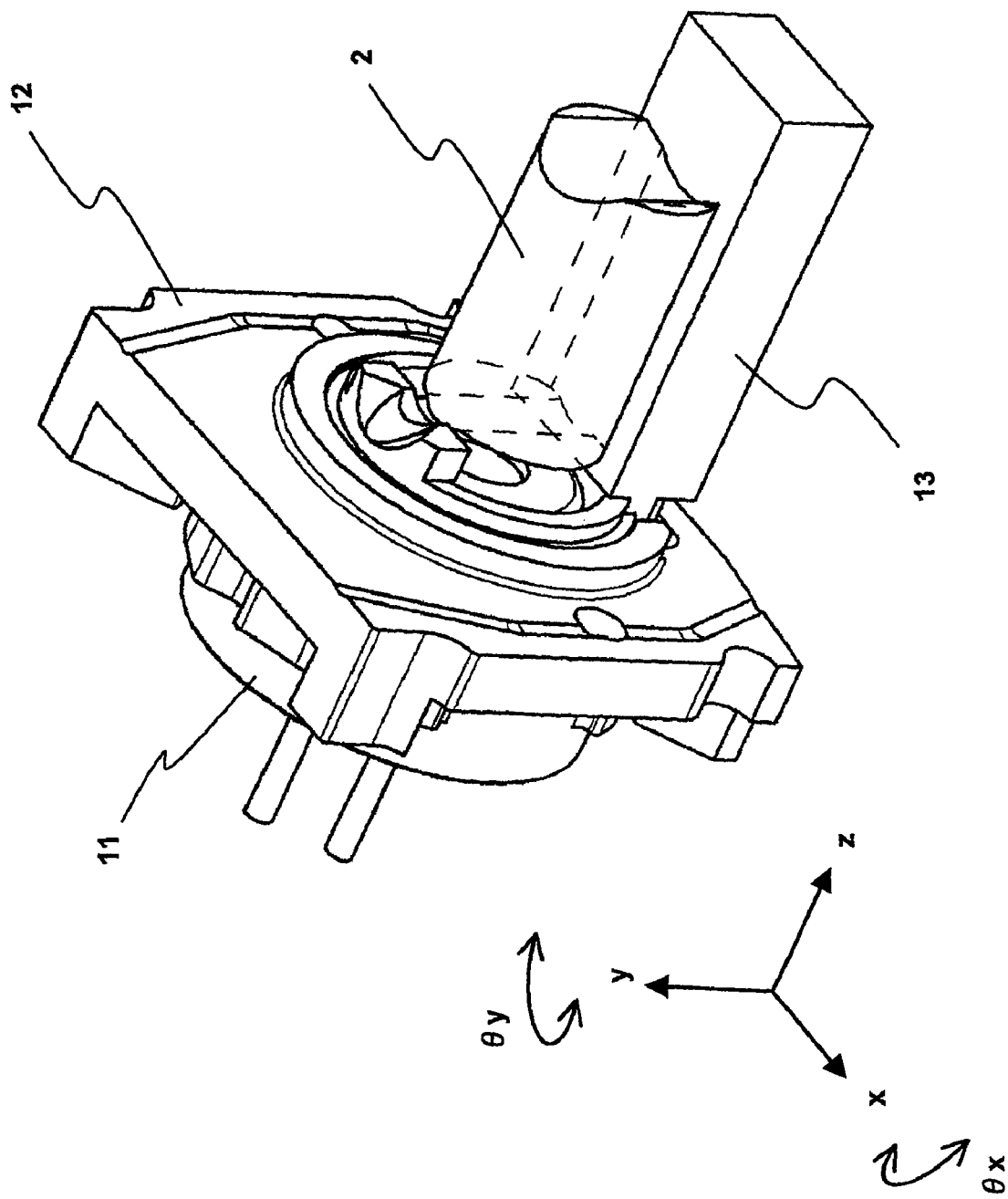
FIG. 6 is a diagrammatic explanatory drawing showing a configuration of the vicinity of a light source portion of an optical pickup according to a third embodiment of the present invention.

The light source 1 is provided in a holder (not shown in FIG. 4(a); a light source tilting holder 11 shown in FIG. 6 and the like) provided on an optical base. In addition, a lens holder 9 is fixed connected to the holder provided on the optical base. The lens holder 9 serves as an example of the mounting plate according to the present invention.

The beam shaping element 2 includes an optical center line 2z of the beam shaping element 2 with respect to the lens holder 9, and is fixed at any of fixing points on a line 2h at which a face 2S perpendicular to the recording surface of the optical disk 7 intersects with the exterior shape of the beam shaping element 2.

As shown in FIG. 4(b), an optical center line is hereby defined as: when the beam shaping element 2 is viewed from an xz cross section, a line connecting a center point 2ic of a part of a circle to become a base of a cylindrical plane on the side of an incident plane and a center point 2oc of a part of a circle to become a base of a cylindrical plane on the side of an output plane 2o; and when viewed from an yz cross section, although the optical center line is a straight line since neither the incident plane nor the output plane has a lens plane and therefore, fundamentally, an optical center does not exist, the optical center line shall tentatively be defined as a line bisecting the area of the yz plane of the beam shaping element 2 and which is orthogonal to at least either a cross section of the incident plane or the output plane.

By adopting such a configuration, even when the optical base retaining the beam shaping element 2 or the lens holder 9 thermally expands due to a temperature change of the optical pickup, the beam shaping element 2 does not cause a displacement in the x direction and an effect of suppressing deterioration of the optical characteristic of the optical pickup can be achieved.

FIG. 5(a) shows a diagram for describing a state of a conventionally configured optical pickup in which a light ray from the laser light source 1 is incident to a cylindrical plane of the beam shaping element 2 when ambient temperature rises. FIG. 5(b) shows a diagram for describing a state in which a light ray from the laser light source 1 is incident to a cylindrical plane of the beam shaping element 2 when ambient temperature rises when using an optical pickup configured according to the present second embodiment. Both drawings show a front view of a cylindrical plane of the beam shaping element 2 as seen from the side of the laser light source 1.

As shown in FIG. 5(a), with a conventionally configured optical pickup, a fixed face of the beam shaping element 2 does not necessarily conform to the major axis direction of a light ray incident from the light source. As ambient temperature of the optical pickup rises, the optical base retaining the beam shaping element 2 or the lens holder 9 thermally expands and a displacement of the beam shaping element 2 occurs with respect to the optical axis from the laser light source 1.

Here, a case will be considered where displacement due to a temperature rise occurs only in the +y direction. As shown in FIG. 5(a), while prior to a temperature rise, the beam shaping element 2 causes a light ray to incident to the center of a cylindrical plane or, in other words, incident so that a major axis direction of the light ray is symmetrical with respect to a generating line of the cylindrical plane, when temperature rises and the beam shaping element 2 is displaced in the +y direction, the light ray becomes incident to a position to which the major axis direction thereof is displaced with respect to the generating line of the cylindrical plane. In other words, the position where the light ray is incident is displaced in the major axis direction with respect to the generating line of the cylindrical plane.

Conversely, in the case of the optical pickup shown in FIG. 5(b) which is configured according to the present second embodiment, since the position at which the beam shaping element 2 is fixed is arranged to be a position perpendicular to the major axis direction of a light ray incident from the laser light source 1, although the position at which the light ray is incident to the beam shaping element 2 when the temperature rises and the beam shaping element 2 is displaced in the +y direction moves in a direction perpendicular to the major axis of the light ray (the y axis direction shown in FIG. 5(b)), no displacement occurs in the major axis direction (the x axis direction shown in FIG. 5(b)).

As shown, with a conventionally configured optical pickup, while a displacement of the beam shaping element 2 in the y axis direction also causes a displacement of the incidence position of the light ray in the major axis direction, with an optical pickup configured according to the present second embodiment, since a displacement in the y axis direction does not cause a displacement of the incidence position of a light ray in the major axis direction, displacement of the beam shaping element 2 in the major axis direction can be suppressed in comparison to a conventional case.

Additionally, in the present second embodiment, when fixing the beam shaping element 2 to the lens holder 9 using an adhesive applied to a face, as long as the adhesive is applied so as to be approximately bilaterally symmetrical with respect to a generating line of the beam shaping element 2, substantial fixing points will be equivalent to those existing on 2h and the effects shown in the present second embodiment can be similarly achieved.

Furthermore, in FIG. 4(a), while the lens holder 9 is arranged as a symmetrical rectangular parallelepiped with reference character 2h as a center thereof, it is more preferable to arrange the lens holder 9 to have a symmetrical shape with reference character 2h as a center thereof in this manner. Moreover, in FIG. 4(a), it is further preferable to have an entire side face of the lens holder 9 fixed to the holder provided on the optical base.

Additionally, in the present second embodiment, the lens holder 9 may alternatively be integrally formed with the optical base. In such a case, the effect of the present second embodiment can be similarly achieved.

Moreover, in the present second embodiment, a similar effect to that of the first embodiment can also be achieved with a configuration in which the face 2S is approximately perpendicular to the recording surface of the optical disk 7.

As described above, by using the optical pickup according to the present second embodiment, a retaining/fixing structure can be provided in which inclining of the optical axis and displacement of the center of light intensity distribution in a far-field pattern are sufficiently suppressed by suppressing displacement with respect to temperature change in a direction perpendicular to the optical axis in addition to the occurrence amount of astigmatism attributable to the ±z direction (hereinafter simply referred to as the z direction) that is the optical axis direction.

Third Embodiment

FIG. 6 is a diagrammatic explanatory drawing showing a structure of a light source portion among a configuration of an optical pickup according to a third embodiment of the present invention. In FIG. 6, like components to those shown in FIG. 1 or FIG. 4 are assigned like reference characters and descriptions thereof shall be omitted.

In FIG. 6, reference numeral 11 denotes a light source tilting holder, and 12 an optical axis adjustment holder. A laser light source 1 is fixed to the light source tilting holder 11 using a method such as adhesion, caulking, and the like. Furthermore, reference numeral 13 denotes a mounting plate attached to the light source tilting holder 11 and on which the beam shaping element 2 can be mounted. In this case, the light source tilting holder 11 is in contact with the optical axis adjustment holder 12 and is capable of rotating approximately around a luminous point.

Through such a configuration, when the laser light source 1 has a gradient of a production emission angle or, in other words, when the optical axis of light actually emitted from the laser light source 1 is inclined by a prescribed angle from an ideal optical axis, since tilting adjustment around the x axis (θx) and around the y axis (yθ) as shown in the diagram can be performed by the light source tilting holder 11 with respect to the optical axis adjustment holder 12, the emission angle can be adjusted to a desired angle together with the entire light source tilting holder 11. The optical axis adjustment holder 12 is in contact with an optical base (not shown) and is provided with a structure enabling optical axis adjustment during assembly of the optical pickup by freely moving slidingly from side to side and up and down.

In this case, the beam shaping element 2 is disposed so that an exterior shape thereof comes into contact with the mounting plate 13 attached to the light source tilting holder 11.

A relationship between a gradient of a light source whose production gradient requires correction and an attachment gradient of the beam shaping element 2 is shown in FIG. 7.

FIG. 7(a) shows a front view of the xz plane and FIG. 7(b) shows a cross-sectional view of the yz plane.

As shown as an example in FIG. 7(a), in order to correct the production gradient of the laser light source 1, even if the light source tilting holder 11 is inclined by θy from a design ideal optical axis O, the beam shaping element 2 can be disposed so that an optical center line 2z thereof is parallel to and overlaps with an optical axis 1z after correction of the gradient of the laser light source 1.

In addition, as shown in FIG. 7(b), the beam shaping element 2 is disposed such that generating line directions of the incident plane and the output plane thereof are perpendicular to a contact plane on which the mounting plate 13 attached to the light source tilting holder 11 and the beam shaping element 2 contact each other.

Through such a configuration, for example, even if the ambient temperature of an optical pickup including the beam shaping element 2 changes, movement of the beam shaping element 2 due to thermal expansion of the holder member is limited to the y' and z' directions and no displacement occurs in the x direction in which the beam shaping element 2 has a lens effect. While the contact portion of the beam shaping element 2 and the mounting plate 13 is arranged as a plane, even if the contact takes the form of a plurality of points or lines, the same effect is achieved as long as a plane including such contact points or lines is approximately parallel to the aforementioned contact plane.

Other examples of the beam shaping element 2 and the mounting plate 13 will now be shown in FIGS. 8 to 16.

Figure 8A:
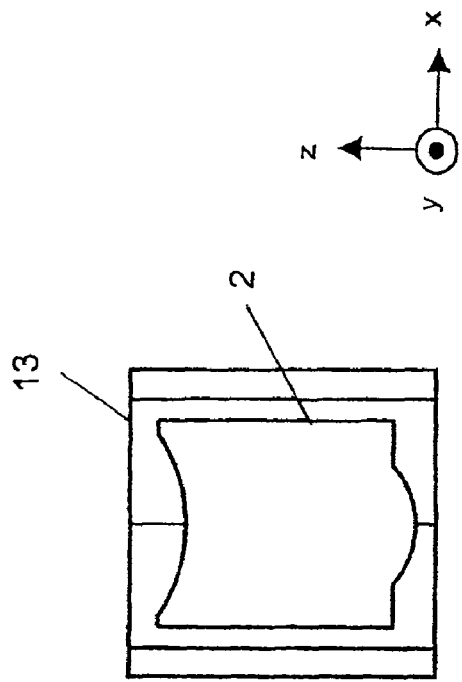
FIG. 8(a) is a plan view of another configuration example of the beam shaping element and a mounting portion of the optical pickup according to the third embodiment of the present invention as seen from the zx plane.
Figure 8B:
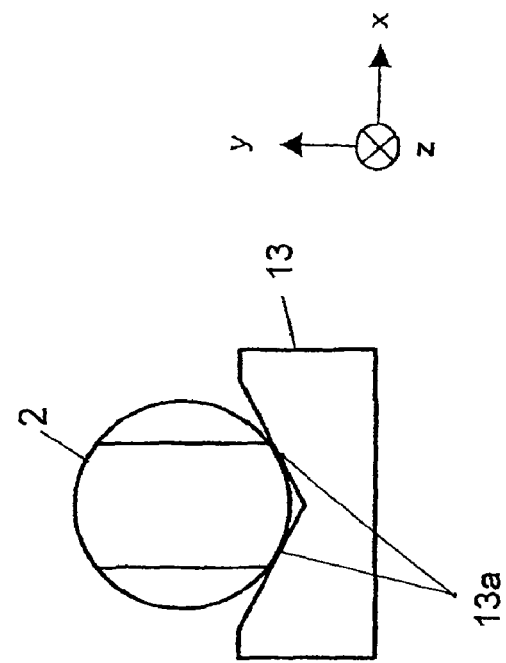
FIG. 8(b) is a front view of the other configuration example of the beam shaping element and the mounting portion of the optical pickup according to the third embodiment of the present invention as seen from the yx plane.
Figure 8C:
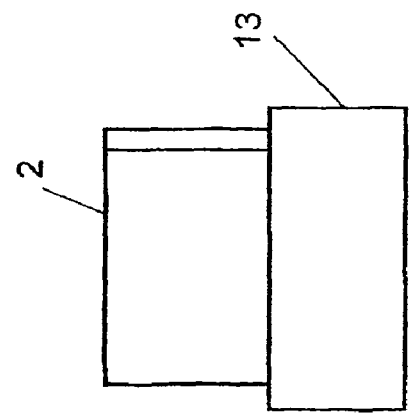
FIG. 8(c) is a side view of the other configuration example of the beam shaping element and the mounting portion of the optical pickup according to the third embodiment of the present invention as seen from the yz plane.

An example shown in FIGS. 8(a), 8(b) and 8(c) is arranged so that a cross section of the mounting plate at the yx plane takes the form of a V groove, whereby the beam shaping element 2 is mounted on ridge lines 13a to be placed in line contact. Note that FIG. 8(a) is a plan view as seen from the zx plane, FIG. 8(b) is a front view as seen from the yx plane, and FIG. 8(c) is a side view as seen from the yz plane. This correspondence shall be commonly applied to FIGS. 8 to 16.

Figure 9A:
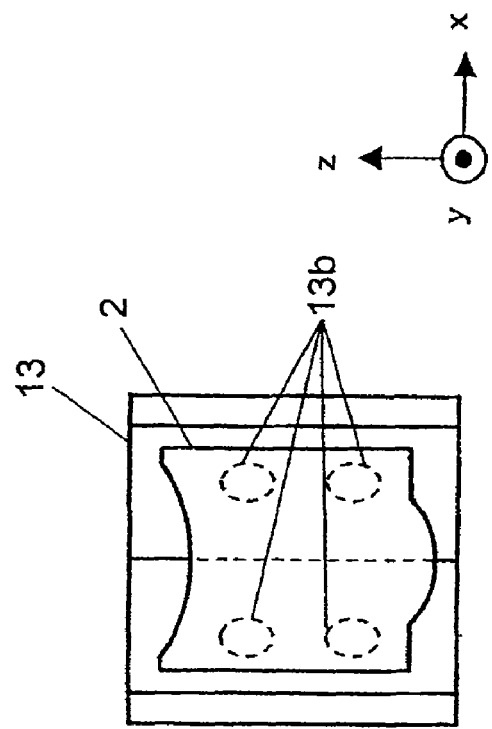
FIG. 9(a) is a plan view of another configuration example of the beam shaping element and the mounting portion of the optical pickup according to the third embodiment of the present invention as seen from the zx plane.
Figure 9B:
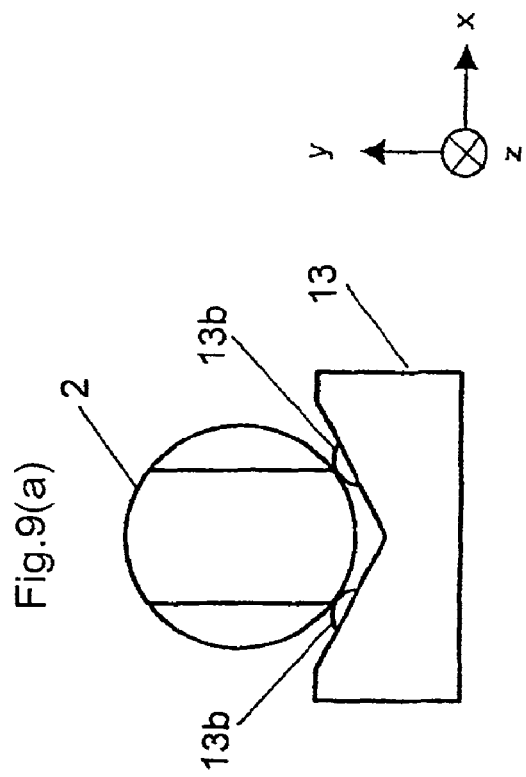
FIG. 9(b) is a front view of the other configuration example of the beam shaping element and the mounting portion of the optical pickup according to the third embodiment of the present invention as seen from the yx plane.
Figure 9C:
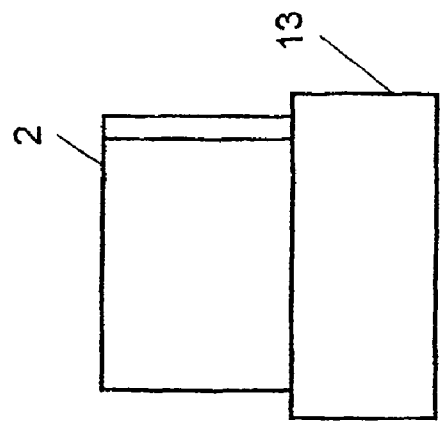
FIG. 9(c) is a side view of the other configuration example of the beam shaping element and the mounting portion of the optical pickup according to the third embodiment of the present invention as seen from the yz plane.

In addition, an example shown in FIGS. 9(a), 9(b) and 9(c) is arranged so that a cross section of the mounting plate 13 at the yx plane takes the form of a V groove, whereby the beam shaping element 2 is mounted on protrusions 13b further provided on an inclined face of the V groove to be placed in point contact.

Furthermore, an example shown in FIGS. 10(a), 10(b) and 10(c) is arranged so that a cross section of the mounting plate 13 at the yx plane takes the form of a V groove, whereby the beam shaping element 2 is mounted on protruding lines 13c further provided on an inclined face of the V groove to be placed in line contact.

Figure 11A:
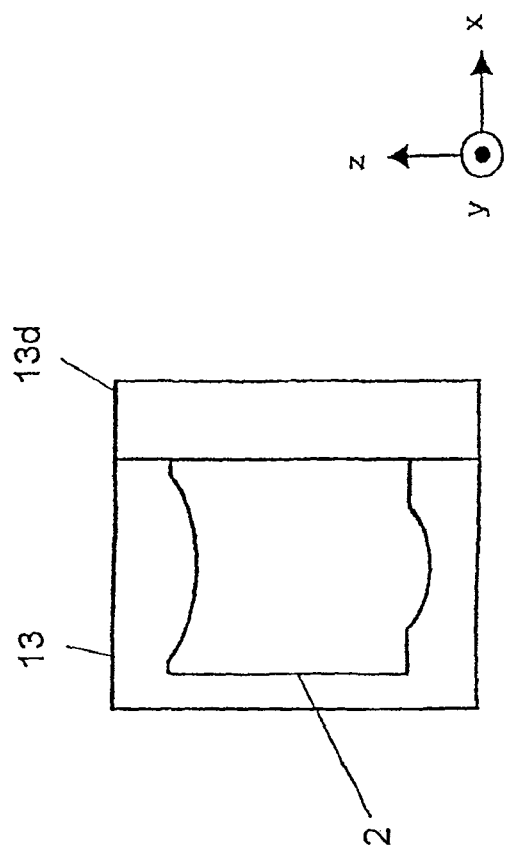
FIG. 11(a) is a plan view of another configuration example of the beam shaping element and the mounting portion of the optical pickup according to the third embodiment of the present invention as seen from the zx plane.
Figure 11B:
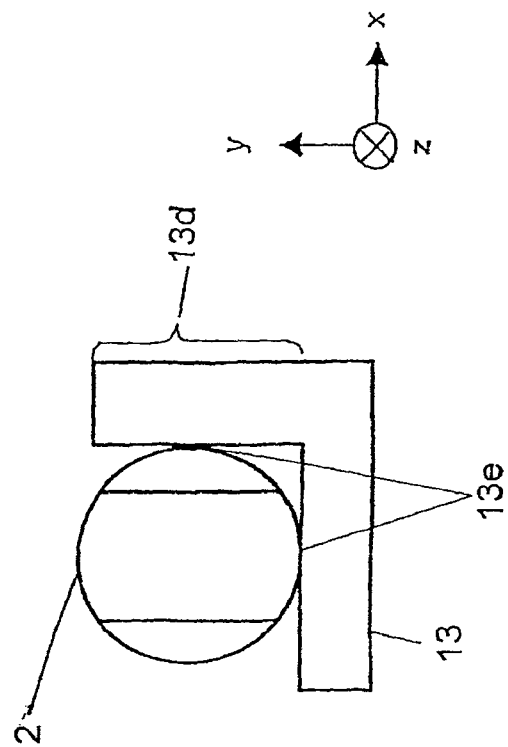
FIG. 11(b) is a front view of the other configuration example of the beam shaping element and the mounting portion of the optical pickup according to the third embodiment of the present invention as seen from the yx plane.
Figure 11C:
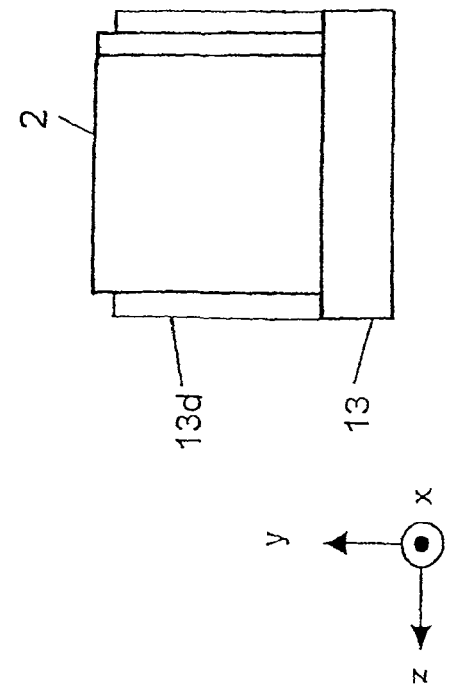
FIG. 11(c) is a side view of the other configuration example of the beam shaping element and the mounting portion of the optical pickup according to the third embodiment of the present invention as seen from the yz plane.

Moreover, an example shown in FIGS. 11(a), 11(b) and 11(c) is arranged so that a side wall 13d is provided on a side face of the mounting plate 13, whereby the beam shaping element 2 is placed in line contact from both x and y directions with the mounting plate 13 and the side wall 13d at respective ridge lines 13e. Particularly, in this case, displacements in the x and y directions can be suppressed.

In addition, an example shown in FIGS. 12(a), 12(b) and 12(c) is arranged so that a side wall 13d is provided on a side face of the mounting plate 13, and by further respectively providing protrusions 13f on the mounting plate 13 and on the side wall 13d, the beam shaping element 2 is placed in point contact from both x and y directions.

Figure 13A:
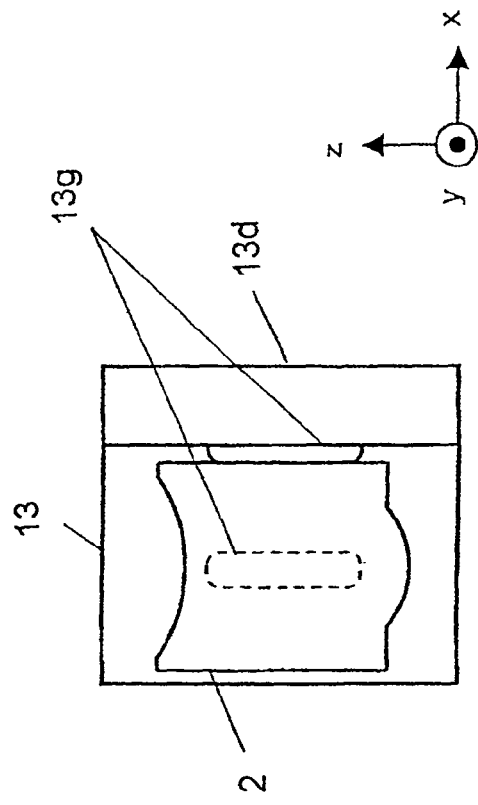
FIG. 13(a) is a plan view of another configuration example of the beam shaping element and the mounting portion of the optical pickup according to the third embodiment of the present invention as seen from the zx plane.
Figure 13B:
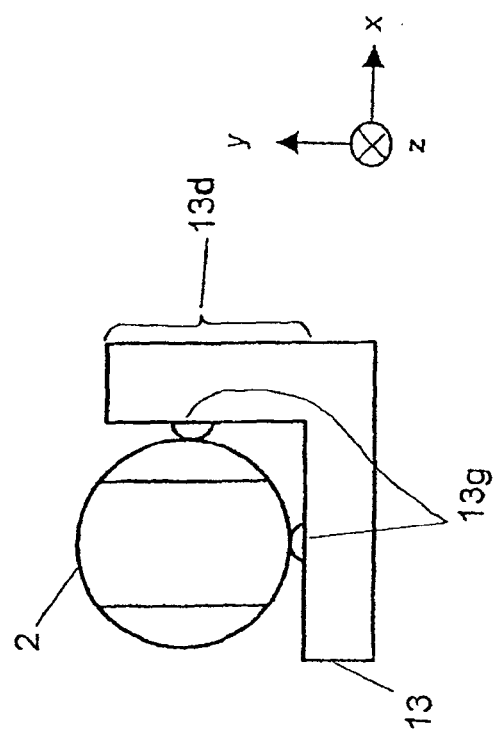
FIG. 13(b) is a front view of the other configuration example of the beam shaping element and the mounting portion of the optical pickup according to the third embodiment of the present invention as seen from the yx plane.
Figure 13C:
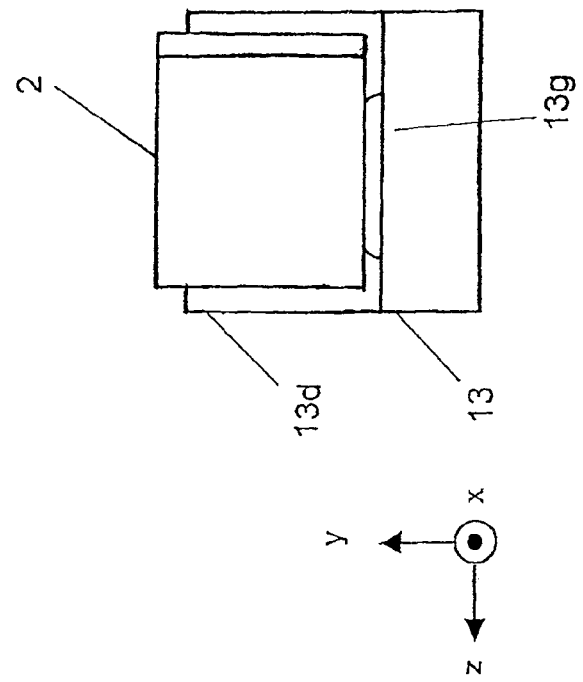
FIG. 13(c) is a side view of the other configuration example of the beam shaping element and the mounting portion of the optical pickup according to the third embodiment of the present invention as seen from the yz plane.

Furthermore, in an example shown in FIGS. 13(a), 13(b) and 13(c), protruding lines 13g are provided in place of the protrusions 13f in the configuration example shown in FIG. 12, whereby the beam shaping element 2 is placed in line contact from both x and y directions.

Figure 14A:
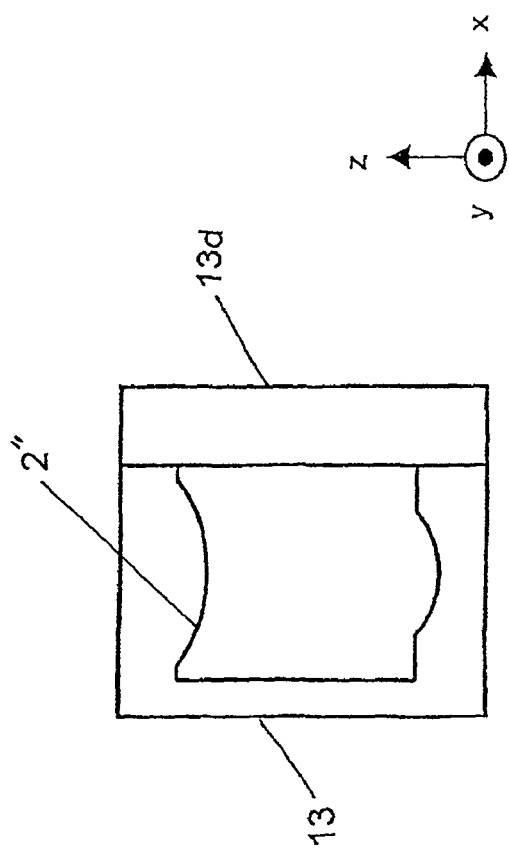
FIG. 14(a) is a plan view of another configuration example of the beam shaping element and the mounting portion of the optical pickup according to the third embodiment of the present invention as seen from the zx plane.
Figure 14B:
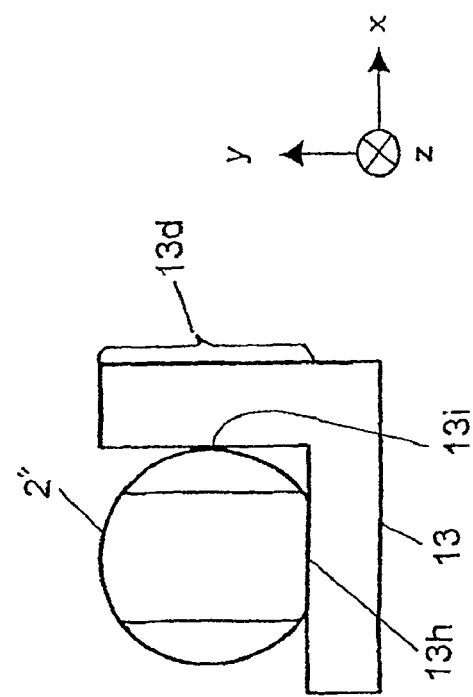
FIG. 14(b) is a front view of the other configuration example of the beam shaping element and the mounting portion of the optical pickup according to the third embodiment of the present invention as seen from the yx plane.
Figure 14C:
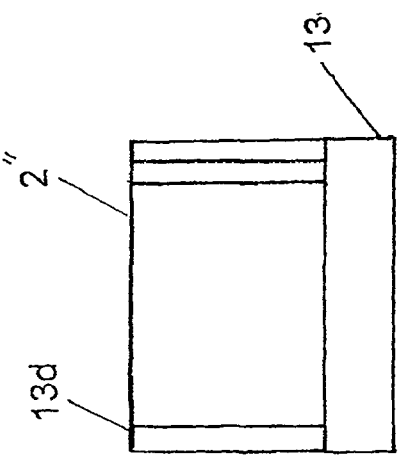
FIG. 14(c) is a side view of the other configuration example of the beam shaping element and the mounting portion of the optical pickup according to the third embodiment of the present invention as seen from the yz plane.

Moreover, an example shown in FIGS. 14(a), 14(b) and 14(c) is arranged such that the beam shaping element 2 is replaced by a beam shaping element 2" whose bottom face is a flat surface, and by mounting the beam shaping element 2" on a side face of the mounting plate 13 having a side wall 13d, the beam shaping element 2" is placed in plane contact on a contact plane 13h and in line contact with the side wall 13d at a ridge line 13i.

Additionally, in an example shown in FIGS. 15(a), 15(b) and 15(c), protrusions 13f are provided on the side wall 13d in the configuration example shown in FIG. 14, whereby the beam shaping element 2" is placed in plane contact on the contact plane 13h and in point contact at the protrusions 13f.

Figure 16A:
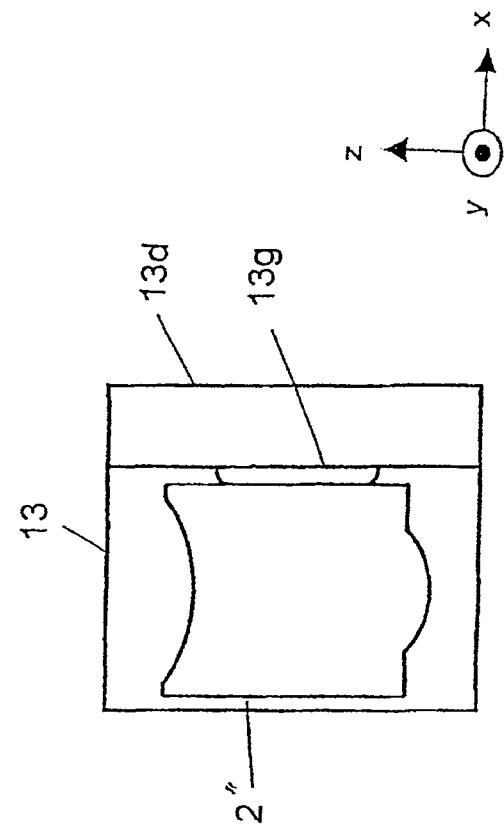
FIG. 16(a) is a plan view of another configuration example of the beam shaping element and the mounting portion of the optical pickup according to the third embodiment of the present invention as seen from the zx plane.
Figure 16B:
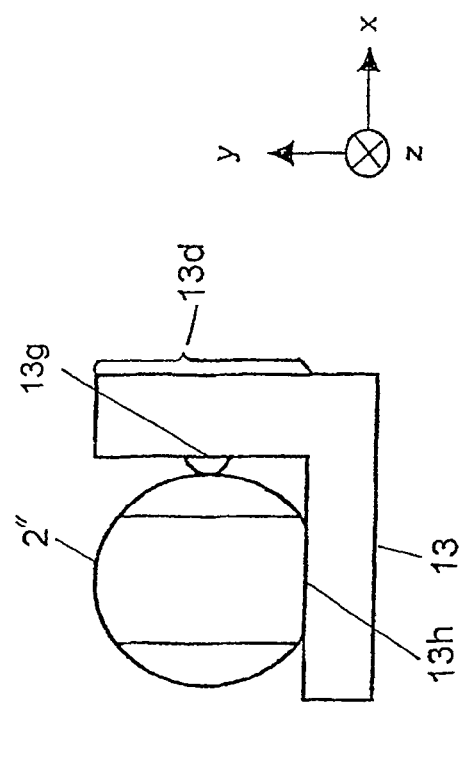
FIG. 16(b) is a front view of the other configuration example of the beam shaping element and the mounting portion of the optical pickup according to the third embodiment of the present invention as seen from the yx plane.
Figure 16C:
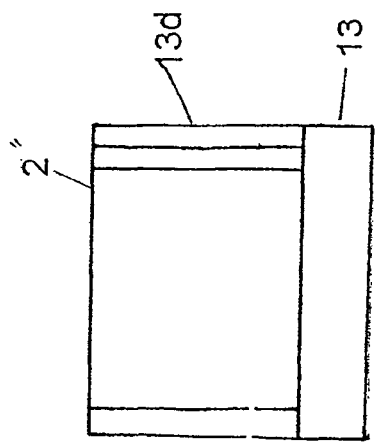
FIG. 16(c) is a side view of the other configuration example of the beam shaping element and the mounting portion of the optical pickup according to the third embodiment of the present invention as seen from the yz plane.

Furthermore, in an example shown in FIGS. 16(a), 16(b) and 16(c), a protruding line 13g is provided on the side wall 13d in the configuration example shown in FIG. 14, whereby the beam shaping element 2" is placed in plane contact on the contact plane 13h and in line contact at the protruding line 13g.

In the above configurations, arrangements of the V groove, the side wall 13d, the protrusions 13b and 13f, the protruding line 13g are approximately parallel to the contact plane and a similar effect to those of the configuration examples shown in FIGS. 6 and 7 can be achieved.

The above-described configurations shown in FIGS. 8 to 16 may be implemented using the optical pickups according to the first and second embodiments.

To supplement, when the light source tilting holder 11 is inclined by θx in order to correct the production gradient of the laser light source 1, the beam shaping element 2 mounted on the mounting plate 13 attached to the light source tilting holder 11 concurrently also inclines by the same angle. When seen from the yz plane, although the beam shaping element 2 operates as a flat plate with a constant thickness and without a lens effect, since light outputted from the laser light source 1 is diverging light, inclining the flat plane within the diverging light causes astigmatism.

However, using the fact that astigmatism occurs when the distance to the luminous point deviates from a design value in the beam shaping element 2, astigmatism attributable to the incline of the beam shaping element 2 is able to correct by a z direction movement of the beam shaping element 2. After the beam shaping element 2 is fixed, even if the temperature changes, movement of the beam shaping element 2 due to thermal expansion of the holder member is limited to the y' and z' directions and no displacement occurs in the x direction in which there is a lens effect. While a displacement in the y' direction implies that the displacement is to be further accompanied by a movement in the z direction, since θx generally ranges from 1 to 2 degrees and is therefore small, the displacement in the z direction at this point is minimal and is unlikely to pose a problem.

Here, in order to have the beam shaping element 2 be self-standing in a stable manner on the mounting plate 13, the exterior shape of the beam shaping element 2 more preferably has a flat face for enabling plane contact with the mounting plate 13. Obviously, the flat face of the exterior shape of the beam shaping element 2 is structurally perpendicular to generating lines of the incident and output planes of the beam shaping element 2. Furthermore, the flat face of the exterior shape of the beam shaping element 2 can also double to apply rotational regulation during, for example, adjustment of the beam shaping element 2.

In addition, with the beam shaping element 2, while the generating lines 2im and 2om are typically arranged to be parallel to each other in order to prevent occurrences of optical aberration, supposing that the generating lines 2im and 2*om* are not parallel to each other, a configuration may also suffice in which the generating line of either the incident plane 2*i* or the output plane 2*o*, and in particular, the generating line of the face on whichever side that plays a significant role in the beam shaping lens effect is approximately perpendicular to a face including a contact portion at which the mounting plate 13 attached to the light source tilting holder 11 and the beam shaping element 2 come into contact with each other, in which case the aforementioned effect of suppressing deterioration in the optical characteristic of the optical pickup with respect to temperature change may be similarly achieved.

A similar effect can be achieved either with a mounting plate 13 integrally formed with the light source tilting holder 11 or with a mounting plate 13 configured by a separate member and fixed to the light source tilting holder 11.

Furthermore, in order to minimally suppress movement in the z direction accompanying expansion/contraction of the light source tilting holder 11 or the mounting plate 13 during a temperature change, the beam shaping element 2 is desirably fixed to the light source tilting holder or the mounting plate 13 by an adhesive or the like at a position where movement in the z direction to the luminous point is as small as possible.

Moreover, in the present third embodiment, by placing the fixing position of the beam shaping element 2 to the light source tilting holder 11 or the mounting plate 13 on a line that is approximately perpendicular to a plane including an optical center line of the beam shaping element 2 and a contact portion at which the beam shaping element 2 comes into contact with the mounting plate 13 attached to the light source tilting holder 11, the effect of the present third embodiment can be further enhanced. In this case, when the fixing position is a face of an adhesive or the like, a higher effect can be achieved if the adhesion surfaces are bilaterally symmetric with respect to the generating line of the beam shaping element 2.

While the present third embodiment has been arranged so that the direction of the generating line of the beam shaping element 2 is perpendicular to a plane including all of the contact portions of the beam shaping element 2 and the mounting plate 13, even if an angle formed thereby deviates from 90 degrees by $\theta z$, since the influence of an x direction component due to, for example, expansion of the optical base or a holder member during a temperature change is around $\sin \theta z$, such an influence is small and is negligible if $\theta z$ is a few degrees.

Additionally, in the present third embodiment, since the light source tilting holder 11 to which the mounting plate is attached performs tilting adjustment around the vicinity of the luminous point of the laser light source 1, a range of movement of the mounting plate 13 or the beam shaping element 2 on the mounting plate 13 accompanying such tilt operation must be taken into consideration. In this light, a recessed portion or a though-hole is preferably provided on the optical base so as to avoid the movement range of the mounting plate 13 or the beam shaping element 2 on the mounting plate 13 during tilting adjustment.

Furthermore, in the present third embodiment, when reference character $\theta x$ as shown in FIG. 7(*b*) is 0, by adopting a configuration in which the generating line 2*im* or 2*om* of the beam shaping element 2 is approximately perpendicular to the recording surface of the optical disk 7, the same effect as the configuration shown by the first embodiment can be achieved, and when $\theta x$ is not 0, by adopting a configuration in which an angle formed by the generating line 2*im* or 2*om* of the beam shaping element 2 and the recording surface of the optical disk 7 is approximately $90° \pm \theta x$, the same effect as the configuration shown by the first embodiment can be achieved.

Fourth Embodiment

Figures 17A, 17B:
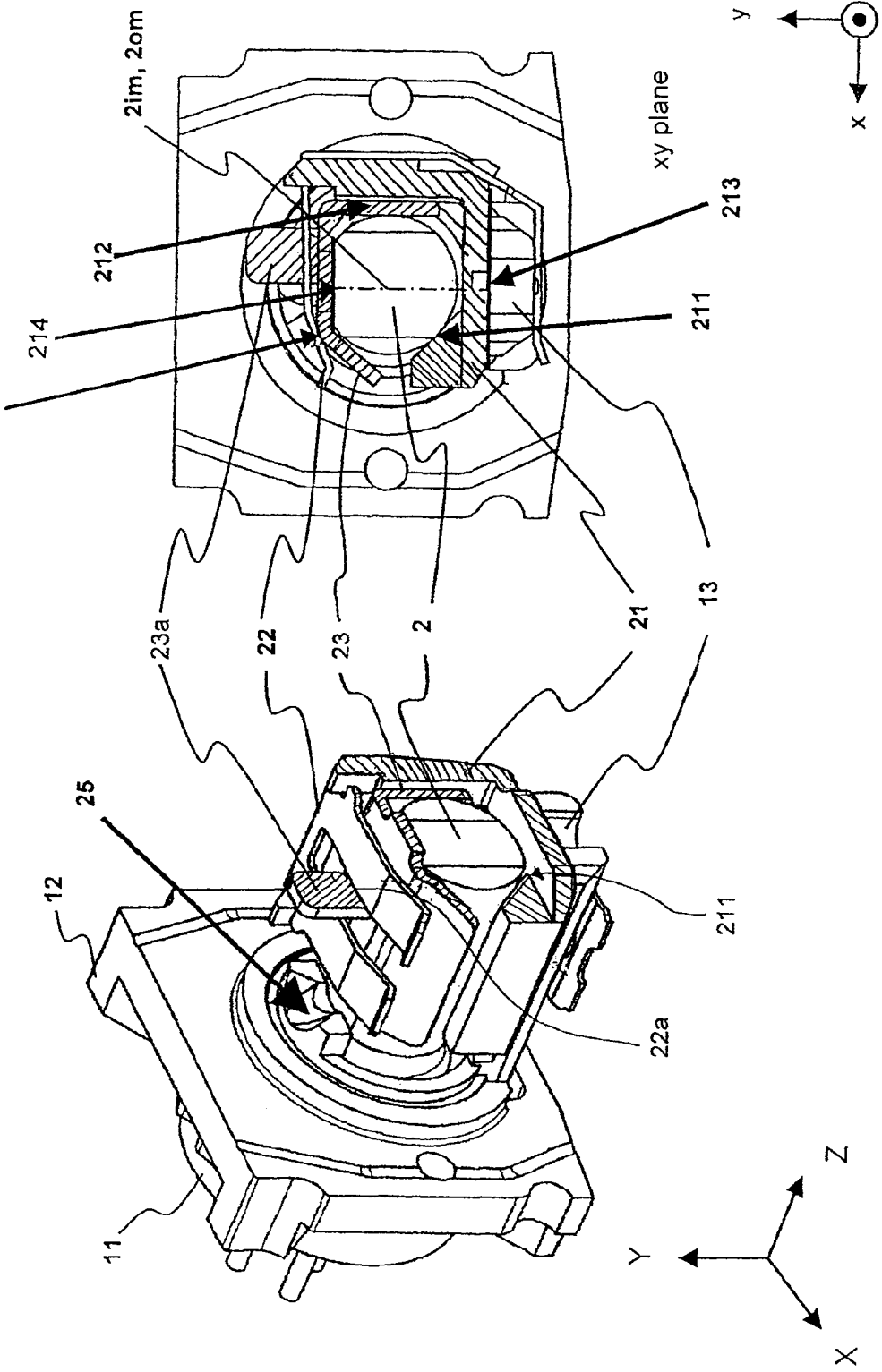
FIG. 17(a) is a perspective view showing a configuration of the vicinity of a light source portion of an optical pickup according to a fourth embodiment of the present invention.
FIG. 17(b) is an xy plane front view showing the configuration of the vicinity of the light source portion of the optical pickup according to the fourth embodiment of the present invention.

FIG. 17 is an explanatory diagram showing a structure of the vicinity of a light source among a configuration of an optical pickup according to a fourth embodiment of the present invention. In FIG. 17, like components to those shown in FIG. 1 to FIG. 7 are assigned like reference characters and descriptions thereof shall be omitted. FIG. 17(*a*) shows a perspective view while FIG. 17(*b*) shows a front view of the xy plane shown in FIG. 17(*a*).

In FIGS. 17(*a*) and 17(*b*), reference character 21 denotes a beam shaping element holder, 22 a beam shaping element retaining spring, 23 a beam shaping element cover, and 23*a* an adjusting knob. The beam shaping element cover 23 is a resin or metallic member provided so as to cover a side face and an upper face of the beam shaping element 2, and the adjusting knob 23*a* for adjustment during assembly of the optical pickup is attached to an upper portion of the beam shaping element cover 23.

In addition, the beam shaping element holder 21 is a resin or metallic member provided so as to dispose the beam shaping element 2 in a state where the beam shaping element cover 23 is attached thereto, and is provided with a shape that covers a right exterior wall of the beam shaping element cover 23 on a right side-face shown in FIG. 17(*b*).

The beam shaping element retaining spring 22 is formed from the mounting portion 13 to turn around to the right side-face of the beam shaping element holder 21 and across an upper face of the beam shaping element cover 23, and causes an elastic force directed towards the beam shaping element 2. Accordingly, the beam shaping element 2 is brought into pressure contact with the beam shaping element holder together with the beam shaping element cover 23.

The beam shaping element cover 23 is fixed by adhesion to a ceiling portion of the beam shaping element 2 at a joint surface 214.

In addition, a right side-face of the beam shaping element cover 23 and an inner wall of the right side of the beam shaping element holder 21 are in plane contact as a contact portion 212.

Furthermore, an inner wall of the left side of the beam shaping element holder 21 and the beam shaping element 2 are in line contact at a ridge line 211.

Moreover, the beam shaping element retaining spring 22 and the beam shaping element cover 23 are in line contact at a ridge line 215.

In addition, the contact plane, the ridge line 211 and the ridge line 215 forming the contact portion 212 are respectively formed so as to extend in directions parallel to the z direction in the diagram or, in other words, directions parallel to the optical axis of the beam shaping element 2.

Furthermore, a slit 22*a* is opened on an upper face of the beam shaping element retaining spring 22, whereby the adjusting knob 23*a* of the beam shaping element cover 23 is exposed to the outside through the slit 22*a*. Accordingly, an adjuster of the optical pickup is able to grasp the adjusting knob 23*a* and move the beam shaping element 2 together with the beam shaping element cover 23 within the beam shaping element holder 21.

In the above configuration, the beam shaping element cover 23 serves as an example of the first outer shell portion according to the present invention. In addition, the beam shaping element holder 21 and the beam shaping element retaining spring 22 serve as an example of the second outer shell portion according to the present invention. Furthermore, the slit 22a serves as an example of the gap according to the present invention. Moreover, the adjusting knob 23a serves as an example of the knob portion according to the present invention. The beam shaping element 2, the beam shaping element holder 21, the beam shaping element retaining spring 22 and the beam shaping element cover 23 serve as an example of the optical element according to the present invention.

As described in the third embodiment presented above, the beam shaping element 2 generally performs adjustment in the z direction as shown in the drawing or, in other words, in an optical axis direction. The structure according to the present fourth embodiment enables adjustment of the beam shaping element 2 using small parts and realizes a stable retaining structure.

A description will now be given. As described above, the beam shaping element 2 receives elastic force from the beam shaping element retaining spring 22 and is fixed inside the beam shaping element cover 23. While an adjuster is able to move the beam shaping element 2 by operating the adjusting knob 23a of the beam shaping element cover 23, the beam shaping element 2 is fixed by the contact portion 212, the ridge line 211 and the ridge line 215 which are mutually parallel along the z axis as shown in the drawing.

Therefore, a range of movement of the beam shaping element 2 is limited only to the extension direction of the contact portion 212, the ridge line 211 and the ridge line 215 or, in other words, to the z direction as shown in the drawing, and movement on the x y plane perpendicular thereto is regulated.

As shown, by configuring an optical element in which the beam shaping element 2 is movable only in an optical axis direction thereof and by providing the optical element on a mounting plate 13 of the optical pickup according to the third embodiment, adjustment in the x y direction as shown in the diagram and adjustment in the z direction as shown in the diagram of an optical axis of a laser light may be performed independently of each other.

In this case, it is possible to perform, in advance, adjustment in the x direction in an easy manner without inclining the beam shaping element holder 21 by θy with respect to the light source tilting holder 11 and fix the light source tilting holder 11 and the beam shaping element holder 21, thereby enabling x direction adjustment and z direction adjustment of the beam shaping element 2 to be performed as independent processes.

This is particularly suitable in the following respect when used as an optical pickup in the configuration according to the first embodiment. That is, as was described in the first embodiment, when increasing RIM intensity in an optical pickup, shaping of a cross-sectional shape of light beam by the beam shaping element 2 and rotation of the optical axis by a light collecting system including the beam splitter 3, the erecting mirror 5 and the like become necessary. During such adjustment, positioning of the optical axis of the laser light outputted from the laser light source 1 with respect to the light collecting system is important.

With such positioning, an adjustment in the x direction as shown in the drawing serves to prevent the emission optical axis of the light beam incident to the optical disk 7 from bending and, as was also described in the third embodiment, an adjustment in the z direction as shown in the drawing is essential for cancelling spherical aberrations that occur in accompaniment with beam shaping by the beam shaping element 2 at the light collecting system.

However, it is extremely difficult to simultaneously perform adjustments in both axial directions.

With an optical pickup according to the present fourth embodiment, since adjustment in the z direction can be performed by a sliding operation of the beam shaping element cover 23 after adjustment in the x direction is performed beforehand by a rotational movement operation of the light source tilting holder 11 using the configuration of the third embodiment, positioning of the optical axis of the laser light with respect to a light collecting system is facilitated. Therefore, the optical pickup according to the first embodiment with increased RIM intensity can now be readily created. In addition, there is a significant effect in that the degree of freedom of assembly and adjustment processes of the optical pickup can be enhanced.

Next, other characteristics of the present embodiment will be described.

Generally, while the beam shaping element 2 is a part moulded from glass or resin, as described above, a resin or a metallic member is used as the beam shaping element holder 21. This also applies to the beam shaping element retaining spring 22. Therefore, it is conceivable that when the beam shaping element 2 contacts these members and slidingly moves, the beam shaping element 2 may be subjected to damaged.

Therefore, in the configuration according to the present fourth embodiment, a part of the external wall of the beam shaping element 2 is covered by the beam shaping element cover 23 so that sliding movement occurs between the beam shaping element holder 21 or the beam shaping element retaining spring 22 and the beam shaping element cover 23. While the sliding movement by direct contact between the beam shaping element 2 and the beam shaping element holder 21 occurs at the ridge line, since this is a line contact, occurrence of the aforementioned damage is assumed to be sufficiently within tolerance. In addition, this enables downsizing and simplification of the beam shaping element cover 23.

The beam shaping element holder 21 may alternatively be configured so as to come into point contact with the beam shaping element 2 instead of the line contact by the ridge line 211. In this case, providing a protrusion similar to the protrusions 13b shown in FIGS. 9, 12 and the like in the third embodiment at a contact portion with the beam shaping element 2 shall suffice. Furthermore, a line contact utilizing the configuration of the protruding lines 13c as shown in FIG. 10 may also be adopted.

Moreover, by having the adjusting knob 23a protrude to the outside, re-adjustment in the z direction against the elastic force of the beam shaping element retaining spring 22 is also facilitated.

Additionally, in the present embodiment, the beam shaping element 2 is configured so that generating lines 2im and 2om of the beam shaping element 2 are approximately perpendicular to a contact plane 213 at which the mounting plate 13 attached to the light source tilting holder 11 and the beam shaping element holder 21 retaining the beam shaping element 2 come into contact.

Through such a configuration, in a manner similar to the second embodiment, displacement of the optical shaping element 2 in the x direction due to expansion/contraction of the mounting plate 13 during a temperature change can be minimized and a structure unlikely to cause deterioration of the optical characteristic of the optical pickup can be realized. While the contact plane 213 of the beam shaping element holder 21 and the mounting plate 13 is arranged as a plane, even if the contact takes the form of a plurality of points or lines, the same effect is achieved as long as a plane including such contact points or lines is approximately parallel to the aforementioned contact plane 213.

In the structure of the beam shaping element holder 21 according to the present fourth embodiment, in FIG. 17, while the respective contact portions and ridge lines with the beam shaping element 2 are configured so as to be bilaterally asymmetrical with respect to the generating lines 2*im* and 2*om* of the beam shaping element 2 as shown in FIG. 17(*b*), the respective contact portions and ridge lines may alternatively be configured so as to be bilaterally symmetrical with respect to the generating lines of the beam shaping element 2. In this case, from a structural perspective, a structure is realized in which the beam shaping element 2 is completely immobile in the x direction during a temperature change inside the optical pickup, which is even more preferable. In essence, the contact portion according to the present invention as the respective contact portions and ridge lines is not limited to any disposition or specific configuration as long as the beam shaping element can be regulated so as not to move in a direction perpendicular to the optical axis thereof.

In addition, with the beam shaping element 2, while the generating lines 2*im* and 2*om* are typically arranged to be parallel to each other in order to prevent occurrences of astigmatism, supposing that the generating lines 2*im* and 2*om* are not parallel to each other, a configuration may also suffice in which the generating line of either the incident plane 2*i* or the output plane 2*o*, and in particular, the generating line of the face on whichever side that plays a significant role in the beam shaping lens effect is approximately perpendicular to a face including the contact plane 213 at which the mounting plate 13 attached to the light source tilting holder 11 and the beam shaping element holder 21 retaining the beam shaping element 2 come into contact with each other, in which case the aforementioned effect of suppressing deterioration in the optical characteristic of the optical pickup with respect to temperature change may be similarly achieved.

In the present fourth embodiment, when using a blue semiconductor laser as the light source, the beam shaping element 2 is desirably made of glass from the perspectives of stability with respect to temperature, temporal durability, and the like.

Additionally, in the present fourth embodiment, from various perspectives including mass production and cost, improvement of product reliability and the like, the light source tilting holder 11 and the optical axis adjustment holder 12 are desirably constituted by a metallic material such as zinc, aluminum and the like.

Furthermore, in the present fourth embodiment, the beam shaping element holder 21 and the beam shaping element cover 23 are also desirably constituted by a metallic material such as zinc, aluminum and the like for the same reason as the light source tilting holder 11 and the like. Desirably, paint or the like is applied to the surface of the beam shaping element holder 21 to increase lubricity so as to enable the beam shaping element 2 to smoothly slidingly move on the beam shaping element holder 21.

In this case, while a lubricating paint may be applied all over, the lubricating paint is desirably applied to at least a face including the ridge line 211 that is a contact portion of the beam shaping element holder 21 and the beam shaping element 2 and respective faces corresponding to the contact portion 212 at which the beam shaping element holder 21 and the beam shaping element cover 23 come into contact with each other.

Moreover, when fixing the beam shaping element holder 21 and the mounting plate 13 by adhesion, in order to prevent degradation of the adhesiveness thereof, in regards to the surface and the vicinity of the mounting plate 13 with respect to the beam shaping element holder 21, the lubricating paint is desirably not applied at this point to an adhesive application portion in the vicinity of the contact plane 213 with the mounting plate 13 that is a surface on the side not opposing the beam shaping element 2 and the beam shaping element cover 23.

Additionally, in the present fourth embodiment, in order to consistently press the beam shaping element 2 against the beam shaping element holder 21 at a constant pressure, the beam shaping element retaining spring 22 is desirably configured by a thin metal having elasticity such as aluminum, stainless steel, copper, and the like.

Furthermore, in the present fourth embodiment, while the adjusting knob 23*a* has been described as being a member that is integrated with the beam shaping element cover 23, the adjusting knob 23*a* may alternatively be a separate member. In this case, from the perspectives of downsizing and the fact that the adjusting knob 23*a* is to be inserted between the beam shaping element 2 and the beam shaping element holder 21 for friction, the adjusting knob 23*a* is advantageously configured by a thin metallic member of the same or different type as the beam shaping element cover 23 to facilitate formation of its shape.

Moreover, in the present fourth embodiment, the beam shaping element retaining spring 22 is provided with a structure that further simultaneously retains the mounting plate 13 attached to the light source tilting holder 11. This enables workability during assembly and structure stability to be further enhanced and is therefore more preferable. However, the beam shaping element retaining spring 22 may be configured so as to retain only the beam shaping element holder 21 and the beam shaping element cover 23.

Additionally, in the present fourth embodiment, fixing the beam shaping element holder 21 and the mounting plate 13 attached to the light source tilting holder 11 by an adhesive when performing x direction adjustment of the beam shaping element 2 enables further stabilization of the structure and is more preferable. The light source tilting holder 11 and the mounting plate 13 may alternatively be integrally formed. Such a structure stabilizes the relative positions of the light source tilting holder 11 and the mounting plate 13 and enables stability with respect to a temperature change to be further increased.

Furthermore, in the present fourth embodiment, by placing the fixing position of the beam shaping element 2 to the light source tilting holder 11 or the mounting plate 13 on a line at which a plane, which includes an optical center line of the beam shaping element 2 and which is approximately perpendicular to a plane including a contact portion at which the beam shaping element holder 21 retaining the beam shaping element 2 comes into contact with the mounting plate 13 attached to the light source tilting holder 11, comes into contact with the exterior shape of the beam shaping element 2, the effect can be further enhanced. In this case, when the fixing position is a face of an adhesive or the like, a higher effect can be achieved if the adhesion surfaces are bilaterally symmetric with respect to the generating line of the beam shaping element 2.

Moreover, with respect to the adhering position, in the same manner as the second embodiment, in order to suppress movement in the z direction accompanying expansion/contraction of the light source tilting holder 11 or the mounting plate 13 during a temperature change by minimum. The beam shaping element 2 is desirably fixed to the light source tilting holder 11 or the mounting plate 13 by an adhesive or the like at a position where movement in the z direction to the luminous point is as small as possible.

In this case, in the present fourth embodiment, since the beam shaping element holder 21 exists between the beam shaping element 2 and the mounting plate 13, it is difficult to directly fix the beam shaping element 2 and the mounting plate 13 to each other. Therefore, in order to fix the light source tilting holder 11 and the beam shaping element 2 to each other using an adhesive, an extension member 25 for applying a fixing adhesive with the beam shaping element 2 has been attached on the light source tilting holder 11.

Fixing the beam shaping element 2 to the extension member 25 by adhesion leaves only the light source tilting holder 11, the extension member 25, and the adhesive that fixes the two to each other as members existing between the light source and the beam shaping element 2, thereby enabling the influence of expansion of the holder during a temperature change to be further reduced and stabilized also in the z direction. Additionally, integrally forming the light source tilting holder 11 and the extension member 25 also achieves an effect in that stability in the z direction during a temperature change is further enhanced.

While the present fourth embodiment has been arranged so that the direction of the generating line of the beam shaping element 2 is perpendicular to a plane including all of the contact portions of the beam shaping element holder 21 and the mounting plate 13, even if an angle formed by the direction of the generating line deviates from 90 degrees by θz, since the influence of an x direction component due to, for example, expansion of the optical base or a holder member is around sin θz, such an influence is small and is negligible if θz is a few degrees.

Additionally, in the present fourth embodiment, in a case where the light source tilting holder 11 has a gradient θx as shown in FIG. 7(*b*) in the third embodiment, when θx is 0, by adopting a configuration in which the generating line 2*im* or 2*om* of the beam shaping element 2 is approximately perpendicular to the recording surface of the optical disk 7, the same effect as the configuration presented in the first embodiment can be achieved. Furthermore, even in a case where θx is not 0, if an angle formed by the generating line 2*im* or 2*om* of the beam shaping element 2 and the recording surface of the optical disk 7 is approximately 90°±θx, the same effect as the configuration presented in the first embodiment can be achieved Moreover, in the present fourth embodiment, since the light source tilting holder 11 to which the mounting plate is fixed performs tilting adjustment around the vicinity of the luminous point of the light source, a range of movement of the mounting plate 13 or the beam shaping element holder 21 on the mounting plate 13 accompanying such a tilt operation must be taken into consideration. In this light, a recessed portion or a though-hole is preferably provided on the optical base so as to avoid the movement range of the mounting plate 13 or the beam shaping element holder 21 on the mounting plate 13 during tilting adjustment. In this case, an optical base refers to a member for disposing the respective optical parts configuring the light collecting systems shown in FIGS. 1 and 3.

Fifth Embodiment

Furthermore, a description will now be given on an optical information device according to a fifth embodiment of the present invention which uses an optical pickup according to the present invention.

Figure 18:
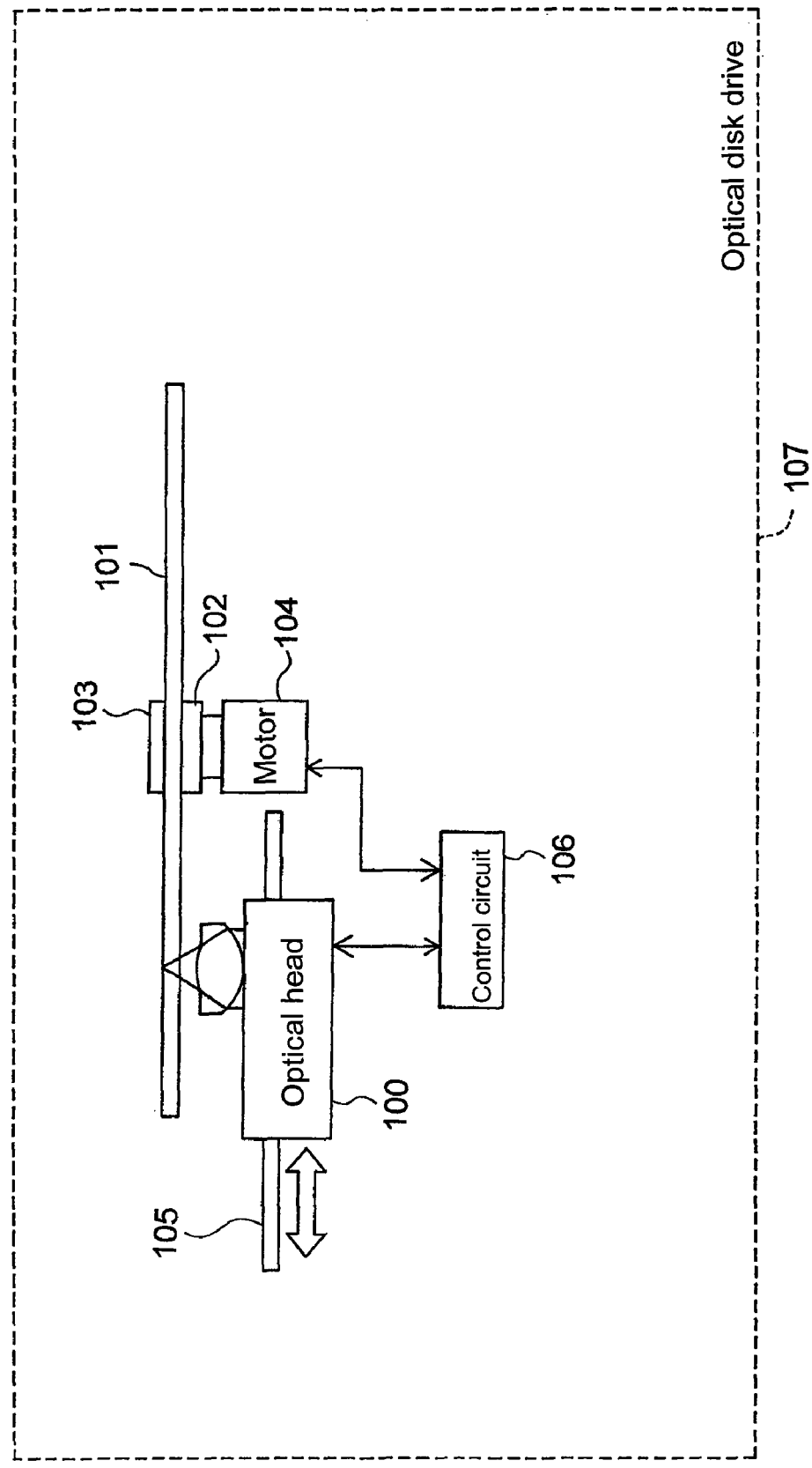
FIG. 18 is an overall configuration diagram of an optical disk drive according to a fifth embodiment of the present invention.

FIG. 18 shows an overall configuration diagram of an optical disk drive 107 as an example of an optical information device according to the present fifth embodiment.

An optical disk 101 is fixed being sandwiched between a turntable 102 and a clamper 103, and is rotated by a motor (rotating system) 104. An optical head 100 having an optical pickup according to the present invention described in any of the first to fourth embodiments is placed on a traverse (transfer system) 105 so as to enable light to be emitted to move from an inner periphery to an outer periphery of the optical disk 101. A control circuit 106 performs focus control, tracking control, traverse control, rotational control of the motor, and the like based on a signal received from the optical head 100. In addition, the control circuit 106 also performs reproduction of information from a reproduction signal and transmission of a recording signal to the optical head 100.

The control circuit 106 serves as an example of the electrical circuit according to the present invention.

Sixth Embodiment

Figure 19:
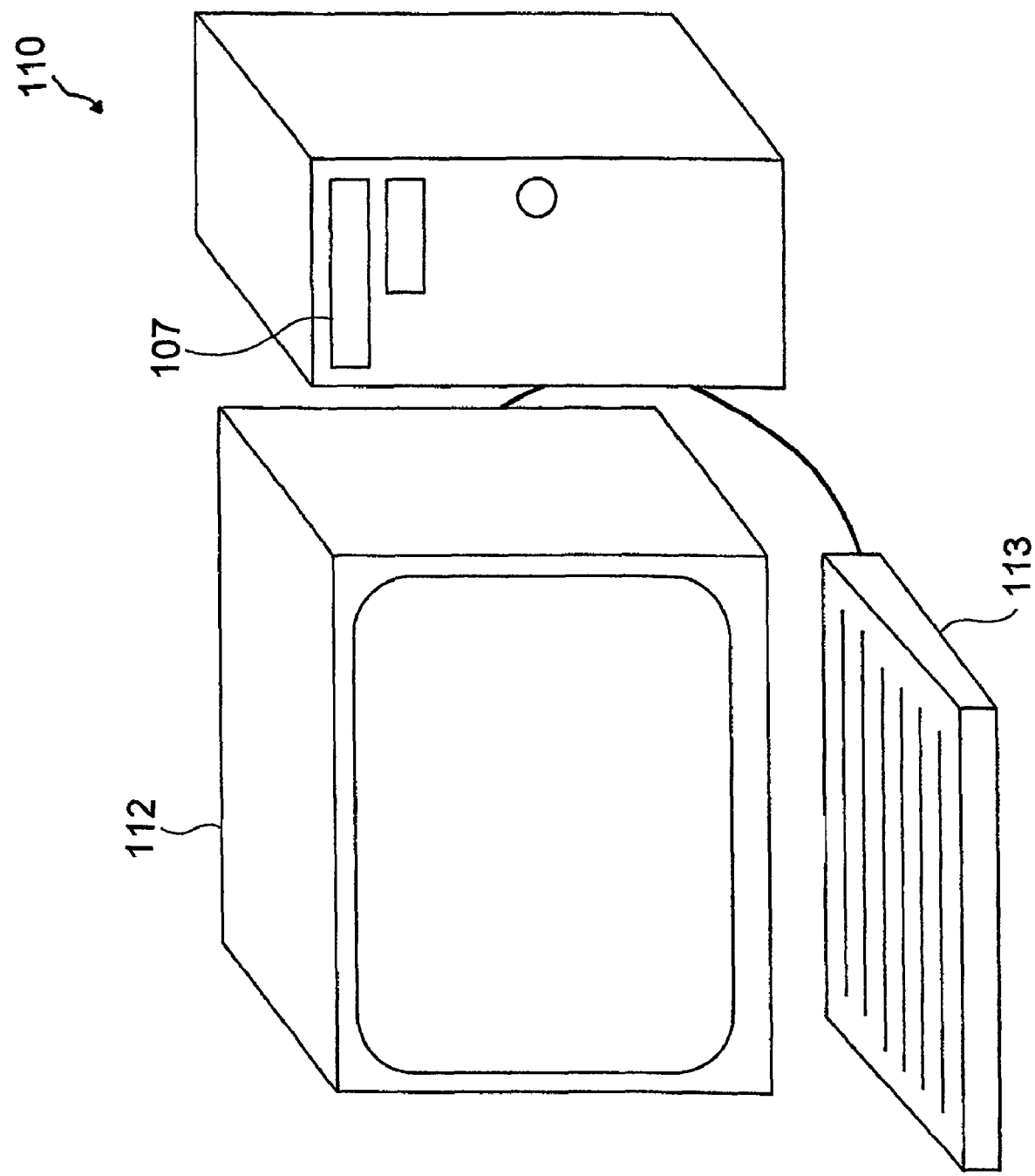
FIG. 19 is a schematic perspective view showing a configuration of a computer according to a sixth embodiment of the present invention.

FIG. 19 shows a schematic perspective view of a computer according to a sixth embodiment of the present invention equipped with the optical disk drive (optical information recording/reproducing device) according to the present invention described in the fifth embodiment.

In FIG. 19, a personal computer 110 includes the optical disk drive 107 according to the fifth embodiment, a keyboard 113 for inputting information, and a monitor 112 for displaying information. In addition, the computer 110 is provided with a computing device that performs computations based on information inputted from the keyboard 113 and on information reproduced from the optical disk drive 107.

The keyboard 113 serves as an example of the input device or the input terminal according to the present invention, while the monitor 112 serves as an example of the output device or an output terminal according to the present invention.

The computer 110 according to the present sixth embodiment equipped with the optical disk drive 107 according to the fifth embodiment described above as an external storage device has the effect of being capable of stably recording or reproducing information on various types of optical disks and being usable in a wide range of applications.

Taking advantage of its large capacity, the optical disk drive 107 is capable of performing data backup of a hard disk inside the computer 110, and taking advantage of the fact that media (optical disk) is inexpensive, highly portable, and has compatibility in that information is readable by other optical disk drives, the optical disk drive 107 enables programs or data to be exchanged with others and to be carried along for personal use. In addition, recording/reproducing of existing media such as a DVD or a CD can also be accommodated.

Seventh Embodiment

Figure 20:
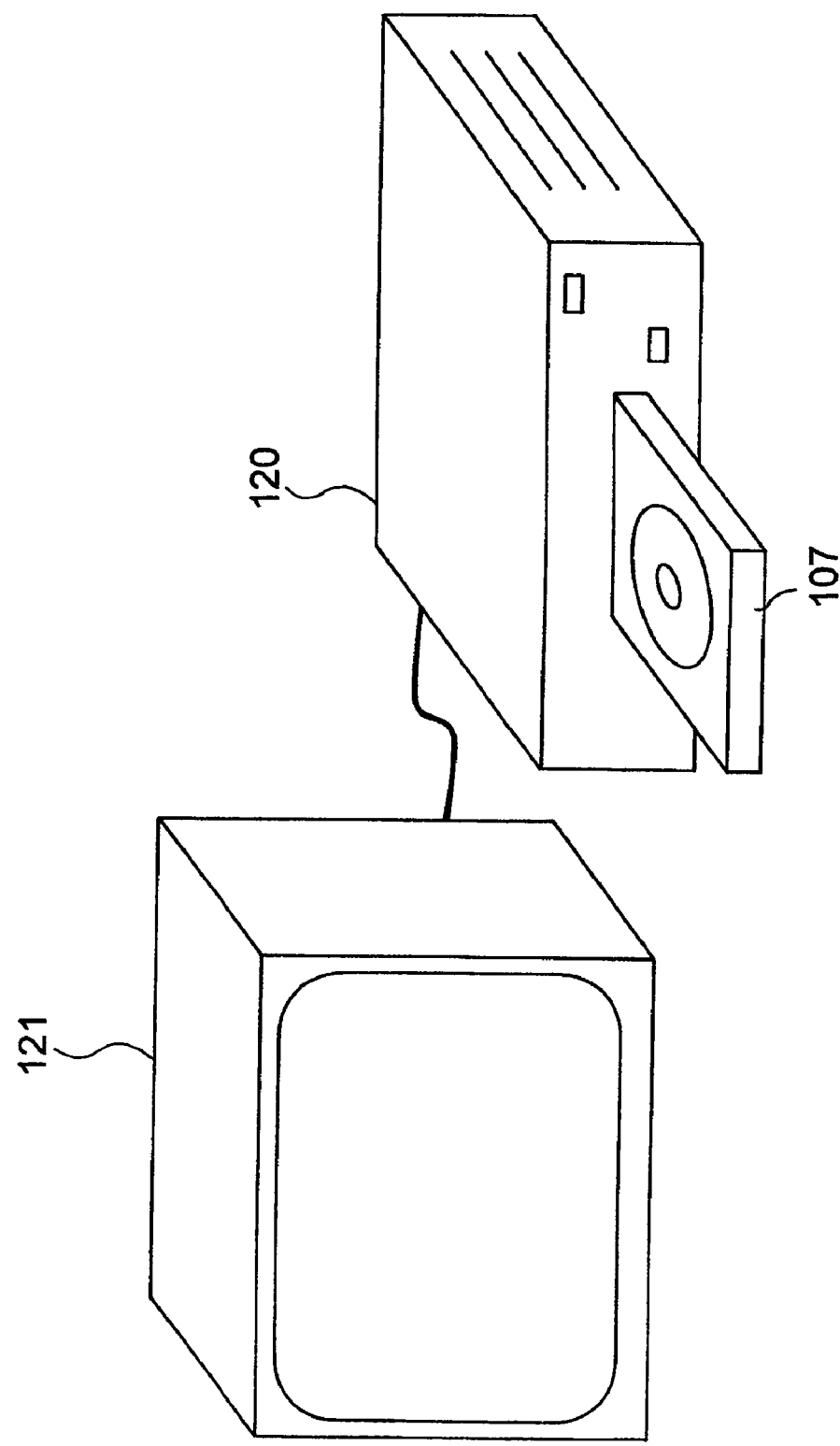
FIG. 20 is a schematic perspective view showing a configuration of an optical disk recorder according to a seventh embodiment of the present invention.

FIG. 20 shows a schematic perspective view of an optical disk recorder (video recording/reproducing device) according to a seventh embodiment of the present invention equipped with the optical disk drive (optical information recording/reproducing device) according to the present invention described in the fifth embodiment.

In FIG. 20, an optical disk recorder 120 according to the present seventh embodiment incorporates the optical disk drive 107 (not shown) according to the fifth embodiment, and is used connected to a monitor 121 for displaying recorded video. In addition, the optical disk recorder 120 is provided with an image-to-information encoder which converts image information into information to be recorded by the optical disk drive 107.

The optical disk recorder 120 serves as an example of the optical information media recorder according to the present invention.

The optical disk recorder 120 equipped with the optical disk drive 107 according to the fifth embodiment described above has the effect of being capable of stably recording or reproducing video on various types of optical disks and being usable in a wide range of applications.

The optical disk recorder 120 is capable of recording video on a medium (optical disk) and reproducing the same whenever convenient. With the optical disk recorder 120, a rewinding operation as is the case with a tape is not required after recording or reproduction, and chasing playback in which an initial portion of a program is reproduced while the program is being recorded or simultaneous recording playback in which a previously recorded program is reproduced while another program is being recorded becomes possible. Taking advantage of the fact that media is inexpensive and highly portable, and has compatibility in that information is readable by other optical disk drives, a recorded video can be exchanged with others or carried along for personal use. In addition, recording/reproducing of existing media such as a DVD or a CD can also be accommodated.

While a case has been described where the optical disk recorder 120 is only provided with the optical disk drive 107, the optical disk recorder 120 may include a built-in hard disk or may incorporate video tape recording/reproducing functions. In such a case, videos can be temporarily saved and backup can be performed in an easy manner.

Eighth Embodiment

Figure 21:
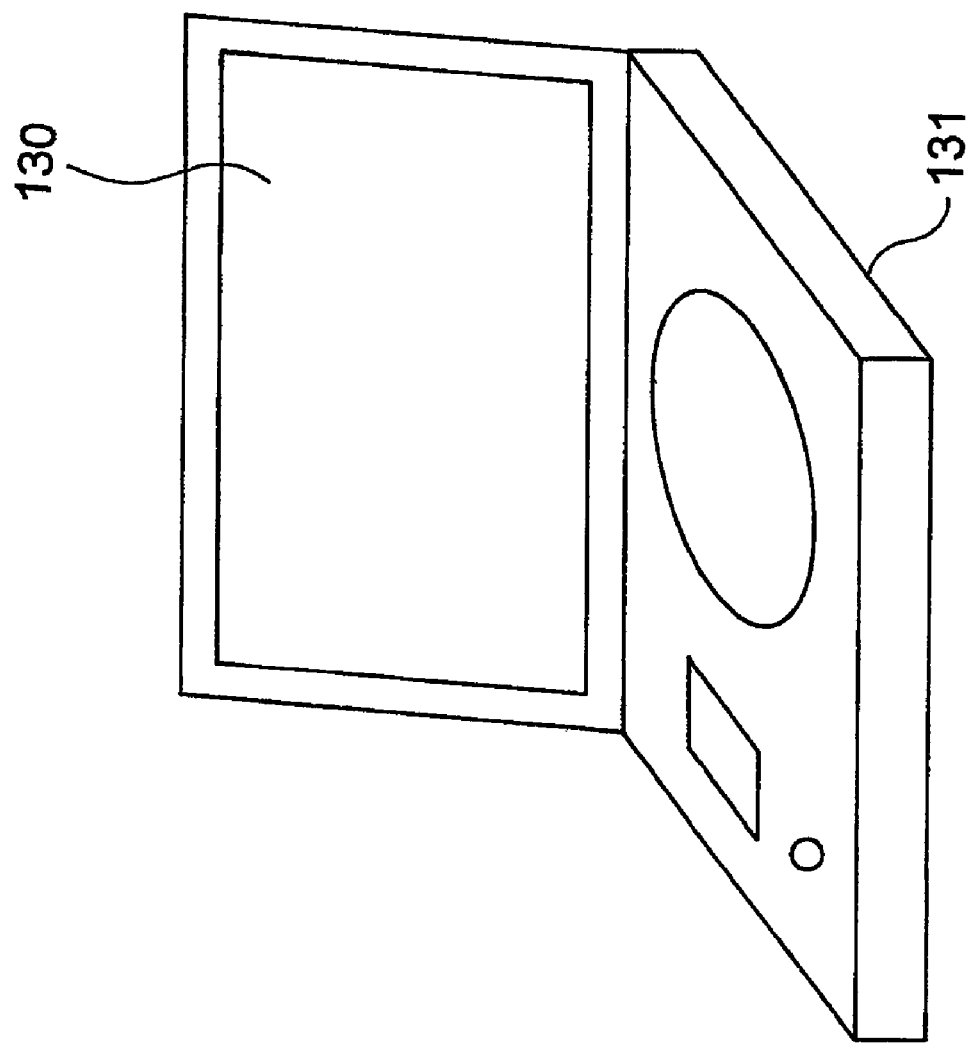
FIG. 21 is a schematic perspective view showing a configuration of an optical disk player according to an eighth embodiment of the present invention.

FIG. 21 shows a schematic perspective view of an optical disk player (video reproducing device) according to an eighth embodiment of the present invention equipped with the optical disk drive (optical information recording/reproducing device) according to the present invention described in the fifth embodiment.

In FIG. 21, an optical disk player 131 according to the present eighth embodiment provided with a liquid crystal monitor 130 incorporates the optical disk drive 107 (not shown) according to the fifth embodiment, and is capable of displaying video recorded on an optical disk onto the monitor 130. In addition, the optical disk player 131 is provided with an information-to-image decoder that converts information signals obtained from the optical disk drive 107 into images. The optical disk player 131 serves as an example of the optical information media player according to the present invention.

The optical disk player 131 equipped with the optical disk drive 107 according to the fifth embodiment described above has the effect of being capable of stably reproducing video on various types of optical disks and being usable in a wide range of applications.

The optical disk player 131 is capable of reproducing video recorded on a medium (optical disk) whenever convenient. With the optical disk player 131, a rewinding operation as is the case with a tape is not required after reproduction, and reproduction may be performed by accessing an arbitrary address in a video. In addition, reproduction of existing media such as a DVD or a CD can also be accommodated.

Ninth Embodiment

Figure 22:
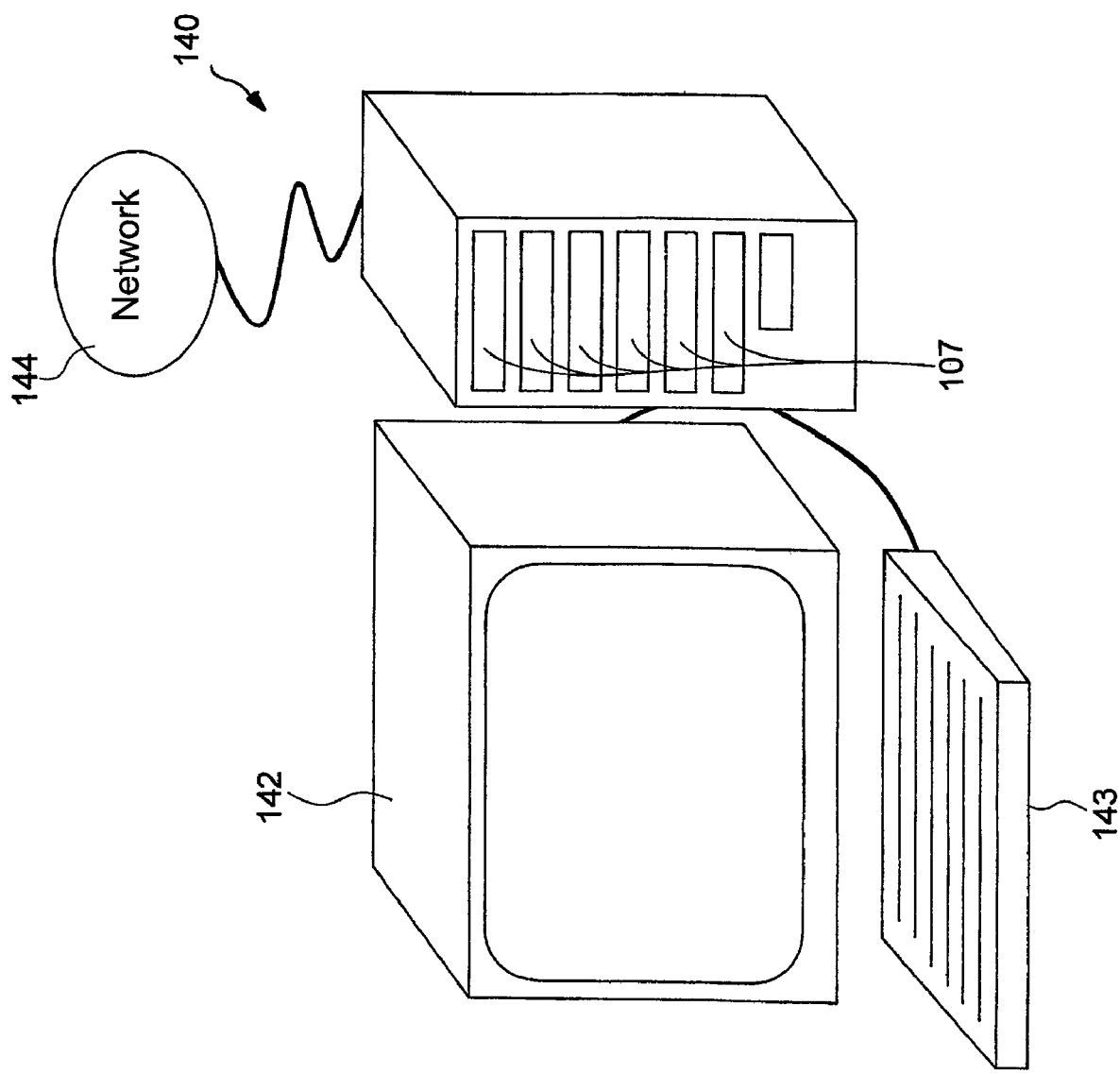
FIG. 22 is a schematic perspective view showing a configuration of a server according to a ninth embodiment of the present invention.

FIG. 22 shows a schematic perspective view of a server according to a ninth embodiment of the present invention equipped with the optical disk drive (optical information recording/reproducing device) according to the present invention described in the fifth embodiment.

In FIG. 22, a server 140 according to the present ninth embodiment includes the optical disk drive 107 according to the fifth embodiment, a monitor 142 for displaying information, a keyboard 143 for inputting information, and is connected to a network 144.

The server 140 serves as an example of the optical disk server according to the present invention. In addition, a terminal of the server 140 connected to the network 144 serves as an example of the input/output terminal that exchanges information with the outside according to the present invention.

The server 140 equipped with the optical disk drive 107 according to the fifth embodiment described above as an external storage device has the effect of being capable of stably recording or reproducing information on various types of optical disks and being usable in a wide range of applications.

Taking advantage of its large capacity, in response to a request from the network 144, the optical disk drive 107 transmits information (images, audio, video, HTML documents, text documents, and the like) recorded on an optical disk. In addition, the optical disk drive 107 records information sent from the network into a requested location. Furthermore, since information recorded on existing media such as a DVD, a CD or the like can also be reproduced, information contained therein can also be transmitted.

Tenth Embodiment

Figure 23:
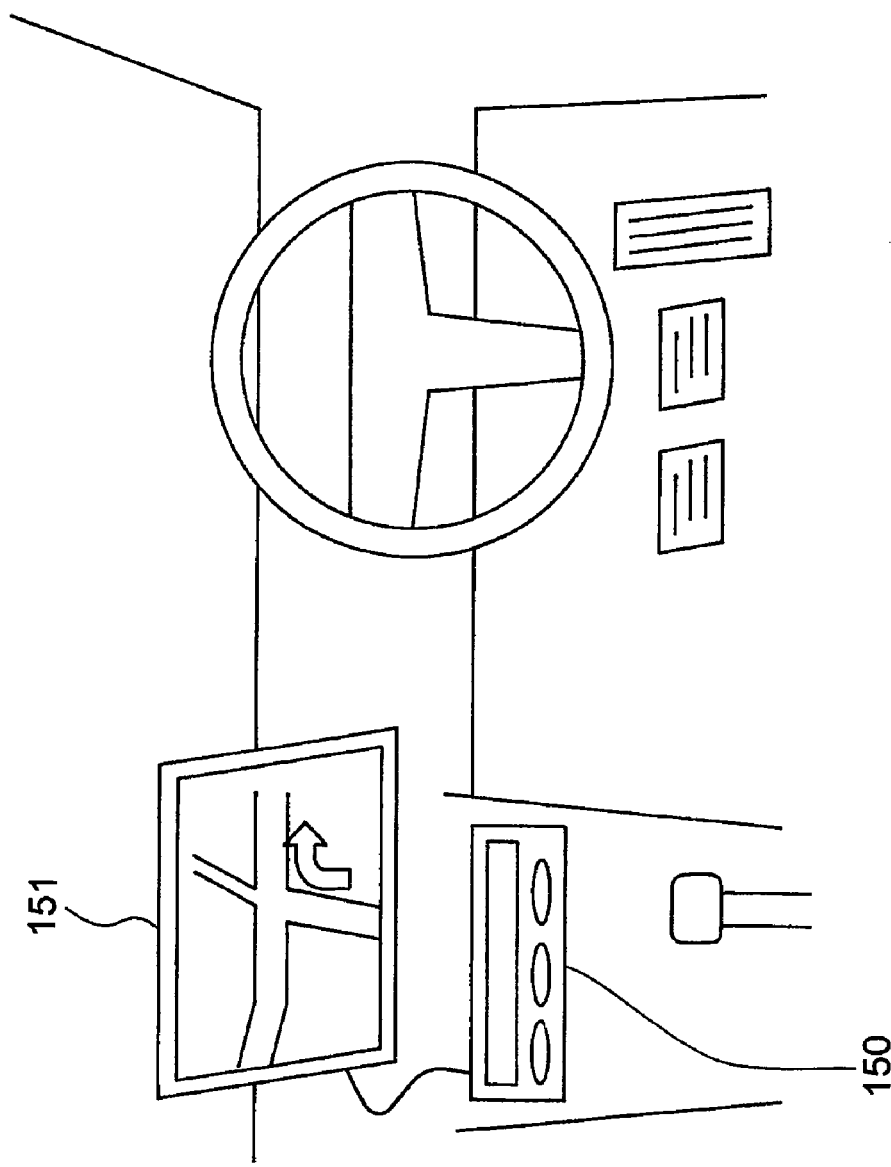
FIG. 23 is a schematic perspective view showing a configuration of a car navigation system according to a tenth embodiment of the present invention.

FIG. 23 shows a schematic configuration diagram of a car navigation system according to a tenth embodiment of the present invention equipped with the optical disk drive (optical information recording/reproducing device) according to the present invention described in the fifth embodiment.

In FIG. 23, a car navigation system 150 according to the present tenth embodiment incorporates the optical disk drive 107 (not shown) according to the fifth embodiment, and is used connected to a liquid crystal monitor 151 for displaying topographical information or destination information. In addition, the car navigation system is provided with an information-to-image decoder that converts information signals obtained from the optical disk drive 107 into images.

The car navigation system 150 equipped with the optical disk drive 107 according to the fifth embodiment described above has the effect of being capable of stably recording or reproducing video on various types of optical disks and being usable in a wide range of applications.

The car navigation system 150 determines a current position based on map information recorded on a medium (optical disk) and on information from a global positioning system (GPS), a gyroscope, a speedometer, an odometer and the like, and displays the position on the liquid crystal monitor 151. In addition, when a destination is inputted, an optimum route to the destination is determined based on map information or road information and displayed on the liquid crystal monitor 151.

By using a large capacity optical disk in order to record map information, a wide area can be covered by a single disk to provide detailed road information. Additionally, information on restaurants, convenience stores, gas stations and the like associated with the vicinity of the road can be concurrently stored in the optical disk to be provided therefrom. Furthermore, while road information becomes outdated and removed from reality as time elapses, since optical disks are interchangeable and media is inexpensive, up-to-date information can be obtained by replacing with a disk containing new road information. Moreover, since recording/reproduction of existing media such as a DVD, a CD and the like is also accommodated, it is also possible to watch a movie or listen to music while in a vehicle.

As described above, by using the optical pickup according to the present invention, an advantageous effect can be achieved in that light use efficiency is improved and high-speed recording, dual layer disks and the like can be accommodated. At the same time, an effect can be achieved in that performance with respect to changes in the temperature or environment of the optical pickup is enhanced.

The optical pickup according to the present invention may be utilized in a wide range of industrial fields from computers to audio-video equipment using optical disks, and its industrial applicability is extremely wide and extensive.

INDUSTRIAL APPLICABILITY

The optical pickup, the optical element, the optical information device, the computer, the optical information medium player, the car navigation system, the optical information medium recorder and the optical disk server according to the present invention have an effect that adjustment and enhancement of RIM intensity using a beam shaping element is possible, and is useful in a wide range of industrial fields from computers to audio-video equipment using optical disks.

The invention claimed is:

1. An optical pickup for use with a light source which emits a divergent beam having an elliptical far-field pattern, the optical pickup comprising:
   a beam shaping element having at least one cylindrical plane and which shapes the divergent beam outputted from the light source into an divergent beam having a prescribed shape in which at least the length in the major axis direction of the elliptical shape is shortened;
   a light collecting portion which collects the divergent beam having the prescribed shape, which is shaped by the beam shaping element onto a recording surface of an optical information recording medium so that the optical axis of the divergent beam is perpendicular to the recording surface;
   a light detecting portion which detects a beam reflected on the optical information recording medium;
   a mounting plate on which the beam shaping element is to be mounted;
   an optical axis adjustment holder provided at a position fixed with respect to the light collecting portion and to which the light source is attached; and
   a light source tilting holder connected to the optical axis adjustment holder so as to be rotationally movable and to which the mounting plate is fixed,
   wherein a position of the optical axis of the elliptical divergent beam emitted from the light source with respect to the light collecting portion is adjusted by a rotational movement of the light source tilting holder, and
   the light source tilting holder is adjusted to a position at which an angle formed by the generating line of the cylindrical plane of the beam shaping element and the recording surface of the optical information recording medium becomes equal to the sum of an angle of an emission angle gradient of the elliptical shape of the divergent beam outputted from the light source in the minor axis direction and a right angle.

2. The optical pickup according to claim 1, further comprising:
   a first outer shell portion provided so as to cover a part of the periphery of the beam shaping element the first outer shell portion being fixed to a part of the periphery of a side wall of the beam shaping element; and
   a second outer shell portion provided so as to cover a part of the periphery of the first outer shell portion and a part of the periphery of the beam shaping element, the second outer shell portion including a contact portion at which the second outer shell portion comes into contact with a part of the periphery of the first outer shell portion and another part of the periphery of the side wall of the beam shaping element so as to be slidingly movable,
   wherein the second outer shell portion includes a gap which exposes the surface of the first outer shell portion to the outside,
   the first outer shell portion includes a knob portion which protrudes from the gap of the second outer shell portion and can be operated from the outside,
   the contact portion of the second outer shell portion has a structure regulating the beam shaping element so as to prevent the beam shaping element from moving in a direction perpendicular to the optical axis direction thereof, and
   the beam shaping element is mounted to the mounting plate via the second outer shell portion.

3. The optical pickup according to claim 2, wherein
   the contact portion of the second outer shell portion includes a first side wall which comes into plane contact with the first outer shell portion, a second side wall which applies elastic force to the first outer shell portion, and a third side wall which comes into either point contact or line contact with the beam shaping element,
   the first side wall, the second side wall and the third side wall are formed in a direction parallel to the optical axis of the beam shaping element, and
   the gap is provided on the second side wall.

4. The optical pickup according to claim 2, wherein
   of the first outer shell portion and the second outer shell portion, paint is applied to at least a part at which the first side wall of the contact portion of the second outer shell portion comes into contact with the first outer shell portion, and a part at which the third side wall of the contact portion of the second outer shell portion comes into contact with the beam shaping element.

5. The optical pickup according to claim 4, wherein
   the contact portion of the second outer shell portion includes a first side wall which comes into plane contact with the first outer shell portion, a second side wall which applies elastic force to the first outer shell portion, and a third side wall which comes into either point contact or line contact with the beam shaping element,
   the first side wall, the second side wall and the third side wall are formed in a direction parallel to the optical axis of the beam shaping element, and
   the gap is provided on the second side wall.

6. The optical pickup according to claim 2, wherein
   the second outer shell portion comprises the two members of:
   a beam shaping element holder including the first side wall and the third side wall; and
   an elastic body including the second side wall, further wherein
   the elastic body and the beam shaping elements holder sandwich the mounting plate so as to come into contact with each other.

7. The optical pickup according to claim 1, wherein the beam shaping element is fixed to the mounting plate by an adhesive.

8. The optical pickup according to claim 1, wherein the light source tilting holder and the mounting plate are integrally formed.

9. The optical pickup according to claim 1, wherein the beam shaping element is fixed to the light source tilting holder by an adhesive.

10. The optical pickup according to claim 1, wherein a contraction rate of the length in the major axis direction of the elliptical shape during the shaping by the beam shaping element is smaller than an emission angle ratio of the length in the major axis direction and the length in the minor axis direction of the elliptical shape of the divergent beam outputted from the light source.

11. An optical information device comprising:
an optical head device including the optical pickup according to claim 1;
a motor which rotates the optical information recording medium; and
an electrical circuit which controls and drives the motor, an optical lens and the light source based on a signal obtained from the optical head device.

12. A computer comprising:
the optical information device according to claim 11;
an input device or an input terminal for inputting information;
a computing device which performs computations based on information inputted from the input device or the input terminal and/or information reproduced from the optical information device; and
an output device or an output terminal for displaying or outputting information inputted from the input device or the input terminal and/or information reproduced from the optical information device and/or a result of a computation performed by the computing device.

13. An optical information medium player comprising:
the optical information device according to claim 11; and
an information-to-image decoder which converts an information signal obtained from the optical information device to an image.

14. A car navigation system comprising:
the optical information device according to claim 11; and
an information-to-image decoder which converts an information signal obtained from the optical information device to an image.

15. An optical information medium recorder comprising:
the optical information device according to claim 11; and
an image-to-information encoder which converts image information to information to be recorded by the optical information device.

16. An optical disk server comprising:
the optical information device according to claim 11; and
an input/output terminal which exchanges information with the outside.

17. An optical pickup for use with a light source which emits a divergent beam having an elliptical far-field pattern, the optical pickup comprising:
a beam shaping element having at least one cylindrical plane and which shapes the divergent beam outputted from the light source into an divergent beam having a prescribed shape in which at least the length in the major axis direction of the elliptical shape is shortened;
a light collecting portion which collects the divergent beam having the prescribed shape, which is shaped by the beam shaping element onto a recording surface of an optical information recording medium so that the optical axis of the divergent beam is perpendicular to the recording surface;
a light detecting portion which detects a beam reflected on the optical information recording medium;
a mounting plate on which the beam shaping element is to be mounted;
an optical axis adjustment holder provided at a position fixed with respect to the light collecting portion and to which the light source is attached;
a light source tilting holder connected to the optical axis adjustment holder so as to be rotationally movable and to which the mounting plate is fixed; and
an optical base on which the light collecting portion is disposed, wherein
a recessed portion or a through-hole is formed on the optical base,
a position of the optical axis of the elliptical divergent beam emitted from the light source with respect to the light collecting portion is adjusted by a rotational movement of the light source tilting holder, and
the light source tilting holder is adjusted to a position at which an angle formed by the generating line of the cylindrical plane of the beam shaping element and the recording surface of the optical information recording medium becomes equal to the sum of an angle of an emission angle gradient of the elliptical shape of the divergent beam outputted from the light source in the minor axis direction and a right angle.

* * * * *